United States Patent [19]

Ino et al.

[11] Patent Number: 5,007,158
[45] Date of Patent: Apr. 16, 1991

[54] METHOD OF MANUFACTURING MAGNETIC HEADS

[75] Inventors: Kazuo Ino, Matsubara; Yoshiaki Shimizu, Minoh; Hiroyuki Okuda, Daitoh; Kousou Ishihara, Daitoh; Takashi Ogura, Daitoh, all of Japan

[73] Assignee: Sanyo Electric Co., Ltd., Osaka, Japan

[21] Appl. No.: 307,654

[22] Filed: Feb. 8, 1989

[30] Foreign Application Priority Data

Feb. 9, 1988 [JP] Japan ................................. 63-28091
May 31, 1988 [JP] Japan ................................ 63-133608
Jul. 27, 1988 [JP] Japan ................................ 63-187727

[51] Int. Cl.$^5$ ........................................... G11B 5/42
[52] U.S. Cl. ...................................... 29/603; 360/121; 360/126
[58] Field of Search ................... 29/603; 360/119-121, 360/126, 127

[56] References Cited

U.S. PATENT DOCUMENTS 4,890,378 1/1990 Suzuki et al. ......................... 29/603

Primary Examiner—Carl E. Hall
Attorney, Agent, or Firm—Armstrong, Nikaido, Marmelstein, Kubovcik & Murray

[57] ABSTRACT

A magnetic head comprises a pair of magnetic core halves (1a, 1b), which are abutted with each other through a nonmagnetic material to define a magnetic gap (2), and ferromagnetic thin films (3a, 3b). The magnetic core halves (1a, 1b), which are formed of ferromagnetic oxide, have gap forming surfaces to be abutted with each other. The ferromagnetic metal thin films (3a, 3b) are selectively formed on the gap forming surfaces of the pair of magnetic core halves (1a, 1b). A ferromagnetic thin film (3b) is so formed that portion (12b, 12c, 12d) to be provided with a track width regulating groove (13b), a coil groove (13c) or a joining member receiving groove (13d) is exposed within a gap forming surface of one magnetic core half member (7b). Another ferromagnetic thin film (3a) is so formed that, in a gap forming surface of another magnetic core half member (7a), a portion (12e, 12f) opposite to the coil groove (13c) or the joining member receiving groove (13d) to be provided in the gap forming surface of the magnetic core half member (7b) is exposed. These ferromagnetic thin films (3a, 3b) are selectively formed by ion means beam etching. Grooves (13b, 13c, 13d) are provided in one magnetic core half (1b) by mechanical working through a dicing saw or the like.

16 Claims, 19 Drawing Sheets

METHOD OF MANUFACTURING MAGNETIC HEADS

BACKGROUND OF THE INVENTION

1. Field of the Invention

The present invention relates to a magnetic head and a method of manufacturing the same, and more particularly, it relates to a magnetic head which is employed for a magnetic recorder/reproducer such as a video tape recorder (VTR), a digital audio tape recorder (DAT) or the like.

2. Description of the Prior Art

In recent years, a recording signal has been highly densified in a magnetic recorder/reproducer such as VTR or DAT, and a metal tape having high magnetic resistance, which employs ferromagnetic metal powder of Fe, Co, Ni or the like as magnetic powder, has been used in correspondence to such a high-density signal.

For example, a metal tape having high magnetic resistance of Hc=1400 to 1500 Oe is employed for a small video tape recorder called 8 mm VTR. This is because a recording medium which can reduce the wavelength for recording a signal is required in order to miniaturize a magnetic recorder/reproducer.

When a conventional magnetic head formed of only ferrite is employed for recording a signal in such a metal tape, on the other hand, a magnetic saturation phenomenon takes place since saturation magnetic flux density of ferrite is about 5500 Gs at the most, and hence performance of the metal tape cannot be sufficiently effectuated. In order to cope with the metal tape having high magnetic resistance, therefore, the magnetic head must have high saturation magnetic flux density in the vicinity of a gap of a magnetic core in addition to high frequency characteristics and abrasion resistance, which are generally required for the core of the magnetic head. In order to satisfy such requirement, there has been proposed a magnetic head for a metal tape, which is called a composite type magnetic head. In this magnetic head, a portion close to a magnetic gap, which easily causes a magnetic saturation phenomenon, is prepared from a magnetic metal material such as permalloy, Sendust or amorphous magnetic substance, for example, having larger saturation magnetization than that of ferrite employed for a magnetic core. The composite type magnetic head is excellent in reliability, magnetic property, abrasion resistance and the like.

FIG. 1 is a perspective view showing the appearance of a conventional magnetic head. Referring to FIG. 1, ferromagnetic metal thin films 3a and 3b formed of a material having high saturation magnetic flux density such as Sendust are provided in the vicinity of a magnetic gap 2, which is formed by abutting a pair of magnetic core halves 1a and 1b prepared from ferromagnetic oxide such as Mn-Zn ferrite through a nonmagnetic material. The magnetic core halves 1a and 1b are joined with each other by a glass member 4, to define a coil groove 5.

In the aforementioned composite type magnetic head, the ferromagnetic metal thin films 3a and 3b are adhered to/formed on upper surfaces of ferromagnetic oxide substrates, which are subjected to specular processing, by sputtering. However, portions close to junction interfaces between the ferromagnetic metal thin films and the substrates of ferromagnetic oxide are nonmagnetized by mutual diffusion and chemical reaction between the elements, inconsistency in crystal structure or the like, to serve as false gaps which exert a bad influence on the performance of the magnetic head.

As shown in FIG. 1, such false gaps are defined in junction interfaces 6a and 6b between the magnetic core halves 1a and 1b and the ferromagnetic metal thin films 3a and 3b, in addition to the original working magnetic gap 2.

In order to suppress the occurrence of such false gaps, junction interfaces 6a and 6b between magnetic core halves 1a and 1b and ferromagnetic metal thin films 3a and 3b are made nonparallel to the surface defining an original working magnetic gap 2, as shown in FIG. 2. Thus, there has also been proposed a composite type magnetic head, which is so formed that no bad influence is exerted on the performance of the magnetic head even if false gaps are defined. The magnetic head having such a structure is complicated in manufacturing process and at a high cost, as compared with that shown in FIG. 1. The conventional magnetic heads shown in FIGS. 1 and 2 are disclosed in Japanese Patent Laying-Open Gazettes Nos. 175122/1983 and 229210/1985, for example.

A method of manufacturing the conventional magnetic head shown in FIG. 1 is now described. FIGS. 3A, 3B, 4A, 4B and 5 are perspective views sequentially showing steps in an exemplary method of manufacturing the conventional magnetic head.

Referring to FIGS. 3A and 3B, specular polishing is first performed on a pair of substrates 7a and 7b, which are formed of ferromagnetic oxide such as Mn-Zn ferrite. Thereafter ferromagnetic metal thin films 3a and 3b of 1 to 10 μm in thickness, which are formed of Sendust or the like, and nonmagnetic thin films 8a and 8b of $SiO_2$ or the like, which are adapted to define gaps, are sequentially formed by sputtering.

Then, as shown in FIGS. 4A and 4B, track width regulating grooves 9a are formed in the upper surface of the first substrate 7a while track width regulating grooves 9b, coil grooves 5 and glass rod receiving grooves 10 are formed in the upper surface of the second substrate 7b by a dicing saw or the like, respectively. In order to form the track width regulating grooves 9a and 9b, the coil grooves 5 and the glass rod receiving grooves 10, the nonmagnetic thin films 8a and 8b, the ferromagnetic metal thin films 3a and 3b and the substrates 7a and 7b are scraped off by a rotating grindstone or the like.

Referring to FIG. 5, the pair of substrates 7a and 7b are washed and thereafter portions 11a and 11b corresponding to track width are abutted with each other in high accuracy. Glass rods 12 are inserted in the glass rod receiving grooves 10. Then the abutted pair of substrates 7a and 7b are heated to 600° to 700° C., thereby to melt the glass rods 12. Thus, the track width regulating grooves 9a and 9b are filled with glass members 4. A block is thus formed through glass junction of the pair of substrates 7a and 7b. Thereafter the block is cut along broken lines I—I and II—II shown in FIG. 5 and ground/polished, thereby to complete the magnetic head shown in FIG. 1.

In the aforementioned manufacturing method, however, the ferromagnetic metal thin films 3a and 3b are formed by sputtering or the like, and hence internal strain is caused between the substrates 7a and 7b and the ferromagnetic metal thin films 3a and 3b by difference in thermal expansion coefficient therebetween. Thus, as shown in FIGS. 4A and 4B, the ferromagnetic metal thin films 3a and 3b are subjected to strain caused by mechanical working upon cutting work of the track width regulating grooves 9a and 9b etc. with the dicing saw, and are separated from each other.

Japanese Patent Laying-Open Gazette No. 287017/1986, for example, discloses a method of manufacturing a magnetic head for solving the aforementioned problem. FIGS. 6A, 6B, 7A, 7B, 8A and 8B are perspective views sequentially showing steps in the method of manufacturing the magnetic head, which is disclosed in the literature.

As shown in FIGS. 6A and 6B, a pair of substrates 7a and 7b, which are formed with ferromagnetic metal thin films 3a and 3b and nonmagnetic thin films 8a and 8b in sequence, are prepared similarly to FIGS. 3A and 3B.

Then, as shown in FIGS. 7A and 7B, portions to be provided with track width regulating grooves are selectively removed from the nonmagnetic thin film 8a and the ferromagnetic thin film 3a formed on the first substrate 7a by ion beam etching or the like. Thus exposed is the upper surface of the substrate 7a, which is provided with first strain parting grooves 12a. Further, portions to be provided with track width regulating grooves, coil grooves and glass rod receiving grooves are selectively removed from the nonmagnetic thin film 8b and the ferromagnetic metal thin film 3b formed on the second substrate 7b by ion beam etching or the like. Thus exposed is the upper surface of the substrate 7b, which is provided with first strain parting grooves 12b, 12c and 12d.

As shown in FIGS. 8A and 8B, recessing is thus performed on the portions of the substrates 7a and 7b exposed in the aforementioned etching step by a dicing saw or the like, thereby to define track width regulating grooves 13a and 13b, coil grooves 13c and glass rod receiving grooves 13d.

Thereafter portions 11a and 11b corresponding to track width are abutted with each other in high accuracy similarly to the step shown in FIG. 5, thereby to form a block through glass junction of the substrates 7a and 7b. The block is cut and ground/polished, to complete the magnetic head.

According to the aforementioned manufacturing method, recessing is mechanically performed by the dicing saw or the like on regions from which the nonmagnetic thin films 8a and 8b and the ferromagnetic metal thin films 3a and 3b are previously removed by ion beam etching or the like. Thus, strain applied to the ferromagnetic metal thin films 3a and 3b by mechanical working is reduced, whereby the rate of separation of the ferromagnetic thin films 3a and 3b is reduced.

FIGS. 9, 10A and 10B are partial sectional views showing a step in which a substrate is pressed against a rotating grindstone in the process of mechanical recessing shown in FIGS. 1A and 1B. Referring to FIG. 9, a rotating grindstone 14 is introduced into regions 12a from which portions of a nonmagnetic thin film 8a and a ferromagnetic metal thin film 3a are previously removed, thereby to form track width regulating grooves 13a. In order to precisely form the track width regulating grooves 13a, the rotating grindstone 14 is introduced into a substrate 7a to be in contact with side surfaces of the remaining portions of the ferromagnetic thin film 3a.

After first grooves are formed by a rotating grindstone 14a, second grooves are formed by another rotating grindstone 14b, as shown in FIGS. 10A and 10B. The rotating grindstones 14a and 14b are brought into contact with side surfaces of remaining portions of a ferromagnetic metal thin film 3a, or pass through portions extremely close to the remaining portions of the ferromagnetic metal thin film 3a. Thus, a ferromagnetic metal thin film is separated by mechanical impact or vibration caused by a rotating grindstone, even if the former is not directly cut by the latter. Namely, it is considered that separation of a ferromagnetic metal thin film is caused by mechanical impact or vibration which is applied thereto even if no mechanical strain is applied to the ferromagnetic metal thin film by a rotating grindstone, since the ferromagnetic thin film has various strain components resulting from condition changes caused before and after formation of the film.

Further, such strain components existing in the ferromagnetic thin film may be integrated into elastic strain, to cause separation of the ferromagnetic metal thin film in employment of the magnetic head.

SUMMARY OF THE INVENTION

An object of the present invention is to provide a method of manufacturing a magnetic head, which can prevent separation of ferromagnetic metal thin films in recessing of magnetic core half members provided with the ferromagnetic metal thin films.

Another object of the present invention is to provide a magnetic head, which can prevent separation of ferromagnetic metal thin films without degrading its magnetic property.

Provided according to the present invention is a method of manufacturing a magnetic head having a magnetic gap between a pair of magnetic core halves which are abutted with each other through a nonmagnetic material. According to this manufacturing method, first and second magnetic core half members are first prepared. These magnetic core half members, which are formed of ferromagnetic oxide, have gap forming surfaces to be abutted with each other for defining a magnetic gap. Then, ferromagnetic thin films of a ferromagnetic metal material are selectively formed on the gap forming surfaces. Within the gap forming surface of the first magnetic core half member, a portion to be provided with a track width regulating groove, a coil groove or a joining member receiving groove is thus exposed. In the gap forming surface of the second magnetic core half member, a portion to be opposite to the coil groove or the joining member receiving groove to be provided on the gap forming surface of the first magnetic core half member is exposed. Further, mechanical working is performed on the exposed portion of the gap forming surfaces. Thus, a track width regulating groove, a coil groove or a joining member receiving groove is formed in the first magnetic core half member. The first and second magnetic core half members thus worked are abutted between the gap forming surfaces, to be joined with each other.

In a preferred embodiment of the method of manufacturing a magnetic head according to the present invention, the process for selectively forming ferromagnetic thin films comprises:

(i) a step of forming ferromagnetic thin films of a ferromagnetic metal material entirely over gap forming surfaces of first and second magnetic core half members; and (ii) a step of selectively removing the ferromagnetic thin films by etching processing.

The step of selectively removing the ferromagnetic thin films is preferably carried out through ion beam etching. A rotating grindstone may be employed as a tool for performing mechanical working. Further, first and second magnetic gaps may be defined by abutting and joining the first and second magnetic core half members with each other. The first magnetic gap is defined by abutting the first and second magnetic core half members between exposed portions of gap forming surfaces and joining the same with each other. The second magnetic gap is defined by abutting and joining the first and second magnetic core half members between portions of the gap forming surfaces provided with the ferromagnetic thin films. Preferably heat-resistant thin films may be interposed/formed between the magnetic core half members and the ferromagnetic thin films. Nonmagnetic thin films are formed on the ferromagnetic thin films, in order to define the magnetic gaps. A step of joining the first and second magnetic core half members with each other is performed as follows: A glass rod is inserted in the joining member receiving groove and molten to fill up the track width regulating groove with glass. Thus, the first and second magnetic core half members are joined with each other.

In a method of manufacturing a magnetic head according to another aspect of the present invention, first and second magnetic core half members are first prepared. The magnetic core half members, which are formed of ferromagnetic oxide, have gap forming surfaces to be abutted with each other for defining a magnetic gap. Then, track width regulating grooves are provided on the gap forming surfaces of the first and second magnetic core half members. The track width regulating grooves are filled with joining members. Further, ferromagnetic thin films of a ferromagnetic metal material are selectively provided on the gap forming surfaces of the first and second magnetic core half members. Within the gap forming surface of the first magnetic core half member, a portion to be provided with a coil groove or a joining member receiving groove is thus exposed. In the gap forming surface of the second magnetic core half member, a portion to be opposite to the coil groove or the joining member receiving groove to be provided on the gap forming surface of the first magnetic core half member is exposed. The exposed portion of the gap forming surfaces is subjected to mechanical working. Thus, the first magnetic core half member is provided with a coil groove or a joining member receiving groove. The first and second magnetic core half members thus worked are abutted between the gap forming surfaces, to be joined with each other.

A magnetic head according to the present invention comprises first and second magnetic core halves and ferromagnetic thin films. The first and second magnetic core halves, which are formed of ferromagnetic oxide, have gap forming surfaces to be abutted with each other for defining a magnetic gap. The ferromagnetic thin films, which are formed of a ferromagnetic metal material, are selectively formed on the gap forming surfaces so that the following portions are exposed or filled with a joining member: The gap forming surface of the first magnetic core half is provided with a coil groove or a joining member receiving groove which is filled with a joining member. In the gap forming surface of the second magnetic core half, a portion which is opposite to the coil groove or the joining member receiving groove provided on the gap forming surface of the first magnetic core half is exposed.

In the inventive method of manufacturing a magnetic head, the ferromagnetic thin films are so selectively formed as to expose not only portions subjected to mechanical recessing but those defining no magnetic gap as much as possible, within the portions to be provided with the magnetic gap. Therefore, internal strain causing separation of the ferromagnetic thin films is parted by the portions exposed as much as possible. Thus mechanical recessing is performed on the exposed portions of the gap forming surfaces of the magnetic core half members after strain components existing in the ferromagnetic thin films are relaxed or reduced as much as possible. Consequently, no elastic strain components existing in the ferromagnetic thin films concentrate in a portion, and hence the ferromagnetic metal thin films are hardly separated even if impact or vibration caused by mechanical recessing is transmitted to the same. It is also possible to prevent the manufacturing yield of such magnetic heads from reduction caused by separation of the ferromagnetic thin films.

According to the inventive magnetic head, further, strain components existing in the ferromagnetic thin films are so reduced as to reduce integration of elastic strain components in the films. Thus, the ferromagnetic metal thin films are prevented from separation in employment of the magnetic head, while desired magnetic property can be maintained for a long time with no degradation.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described in detail with reference to the accompanying drawings.

FIGS. 11A to 13B are perspective views sequentially showing steps in a method of manufacturing a magnetic head according to a first embodiment of the present invention.

Figure 11A:
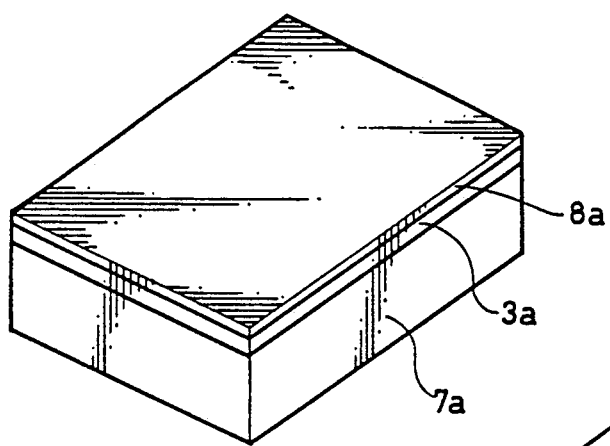
FIGS. 11A, 11B, 12A, 12B, 13A and 13B are perspective views sequentially showing steps in a method of manufacturing a magnetic head according to a first embodiment of the present invention.
Figure 11B:
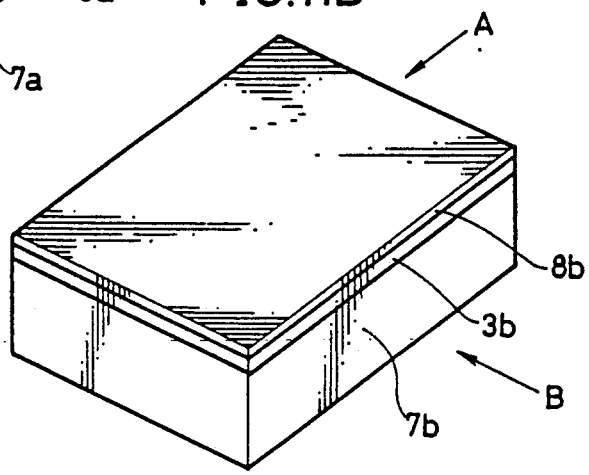

Referring to FIGS. 11A and 11B, specular polishing is performed on surfaces, for forming magnetic gaps, of a pair of substrates 7a and 7b which are formed of ferromagnetic oxide such as Mn-Zn monocrystal or polycrystal ferrite, Ni-Zn monocrystal or polycrystal ferrite, ferroxplana or the like, and then ferromagnetic metal thin films 3a and 3b are formed by sputtering. The ferromagnetic metal thin films 3a and 3b are formed of a metal material such as Sendust alloy, permalloy, Fe-Al alloy, Fe-Co alloy, Fe-Si alloy, Fe-C alloy, metal-metal or metal-metalloid amorphous alloy or the like. The ferromagnetic metal thin films 3a and 3b are about 1 to 10 μm in thickness. Nonmagnetic thin films 8a and 8b, which are prepared from a nonmagnetic material such as $SiO_2$, $TiO_2$, $Al_2O_3$, $Ta_2O_5$, Ti, Cr or the like, are formed on the ferromagnetic metal thin films 3a and 3b, for forming magnetic gaps.

In order to suppress action of false gaps, the surfaces of the substrates 7a and 7b for forming magnetic gaps are etched by phosphoric acid or the like after specular polishing. Then the surfaces of the substrates 7a and 7b for forming magnetic gaps are subjected to reverse sputtering by inert gas ions, and thereafter heat-resistant thin films (not shown) are formed by sputtering or the like. The ferromagnetic metal thin films 3a and 3b may be formed on the heat-resistant thin films. The inventors have found that it is possible to suppress occurrence of false gaps by interposing such heat-resistant thin films between the substrates 7a and 7b for providing magnetic core halves and the ferromagnetic metal thin films 3a and 3b. The heat-resistant thin films are prepared from a chemically stable metal having a high melting point, or oxide which is coupled with oxygen in a state hardly changed by temperature difference. Examples of such a material are metals having high melting points such as Ti, Cr, Mo, W and Pt, heat-resistant oxides such as $SiO_2$, $TiO_2$, $ZrO_2$, $Al_2O_3$, $Y_2O_3$, $Ta_2O_4$, $V_2O_5$, MgO and CaO, and the like.

Figure 12A:
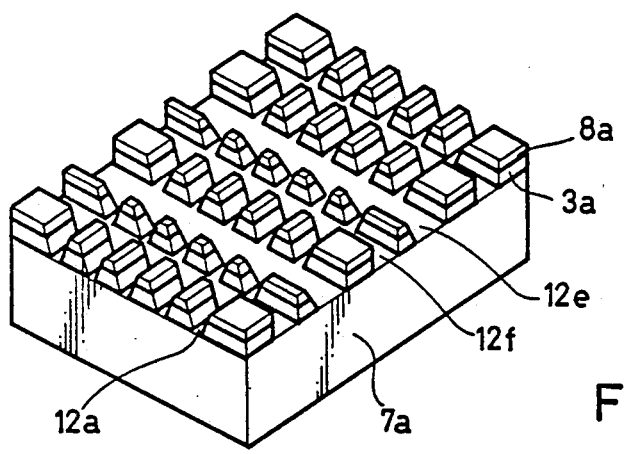
Figure 12B:
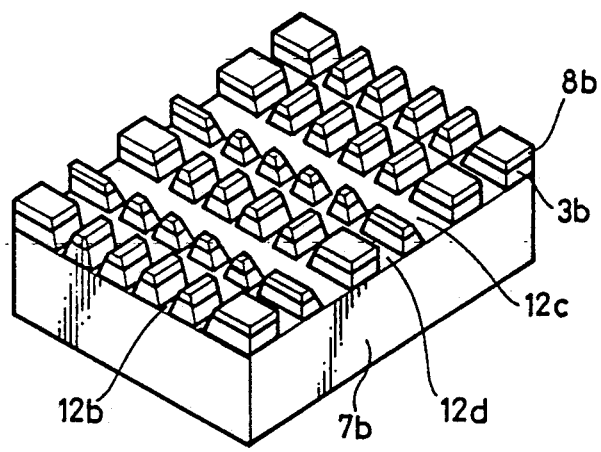

Then, as shown in FIGS. 12A and 12B, portions to be provided with track width regulating grooves are removed from the nonmagnetic thin film 8a and the ferromagnetic metal thin film 3a provided on the first substrate 7a by ion beam etching or the like, thereby to expose portions of the substrate 7a provided with first strain parting grooves 12a. Further, portions to be provided with track width regulating grooves, coil grooves and glass rod receiving grooves are also selectively removed from the nonmagnetic thin film 8b and the ferromagnetic metal thin film 3b formed on the second substrate 7b by ion beam etching or the like, thereby to expose portions of the substrate 7b provided with first strain parting grooves 12b, 12c and 12d. Then, portions opposite to the first strain parting grooves 12c and 12d of the second substrate 7b are removed from the nonmagnetic thin film 8a and the ferromagnetic metal thin film 3a provided on the first substrate 7a by ion beam etching or the like. Portions of the first substrate 7a, which are provided with second strain parting grooves 12e and 12f, are thus exposed. The aforementioned heat-resistant thin films are also removed at this time.

Figure 13A:
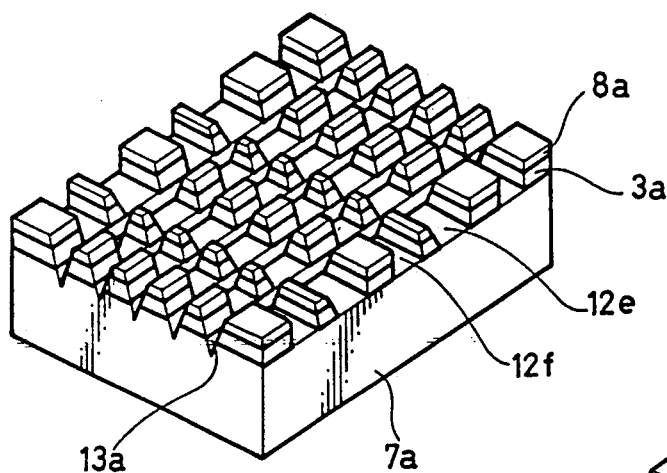
Figure 13B:
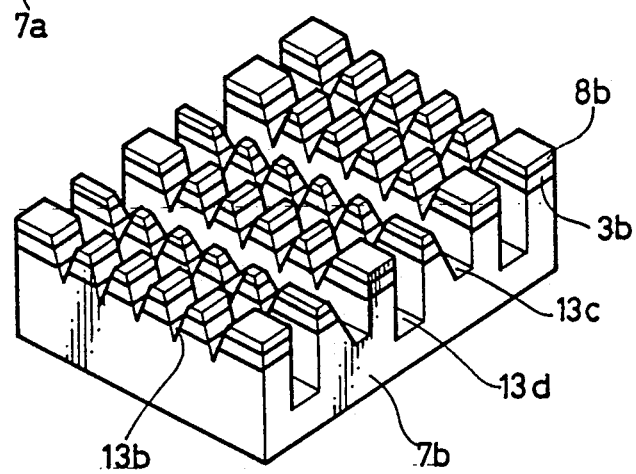

As shown in FIGS. 13A and 13B, the portions of the substrates 7a and 7b exposed in the etching step are subjected to mechanical recessing by a dicing saw employing a rotating grindstone or the like, thereby to define track width regulating grooves 13a and 13b, coil grooves 13c and glass rod receiving grooves 13d.

Figure 5:
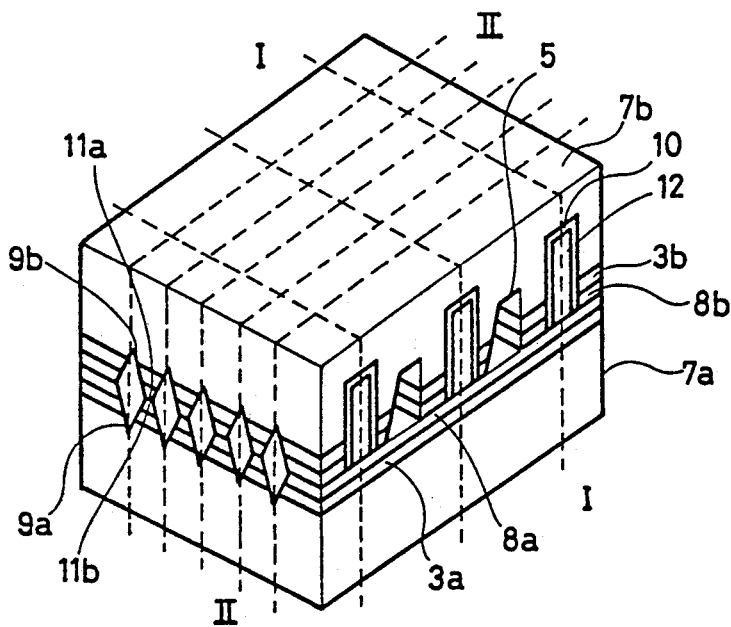
Figure 6A:
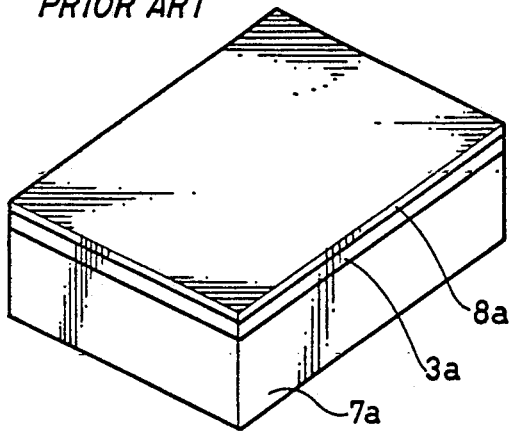
FIGS. 6A, 6B, 7A, 7B, 8A and 8B are perspective views sequentially showing steps in another exemplary method of manufacturing the conventional magnetic head shown in FIG. 1.
Figure 6B:
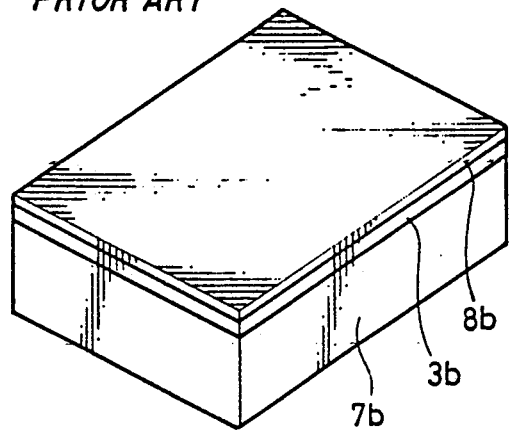
Figure 7A:
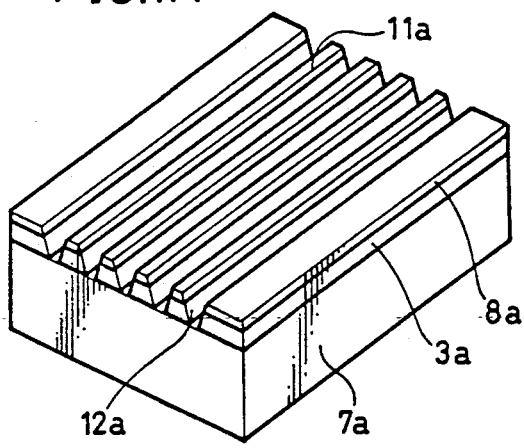
Figure 7B:
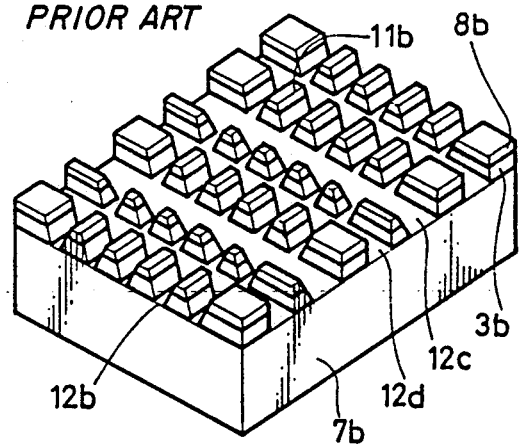
Figure 8A:
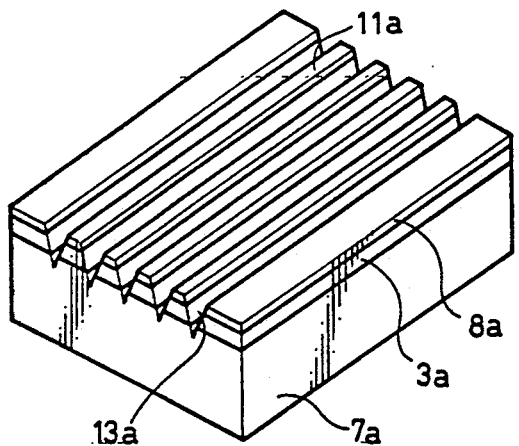
Figure 8B:
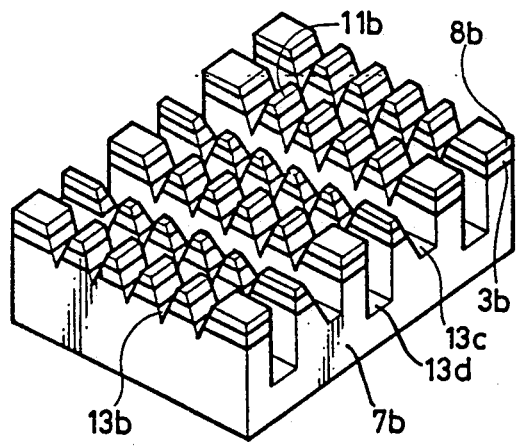
Figure 9:
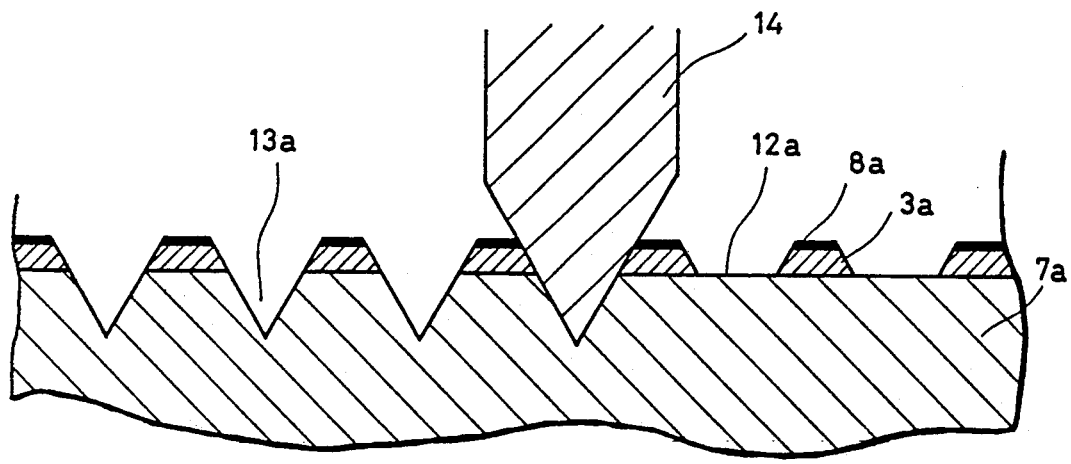
FIGS. 9, 10A and 10B are partial sectional views showing the process of recessing magnetic core half members.
Figure 10A:
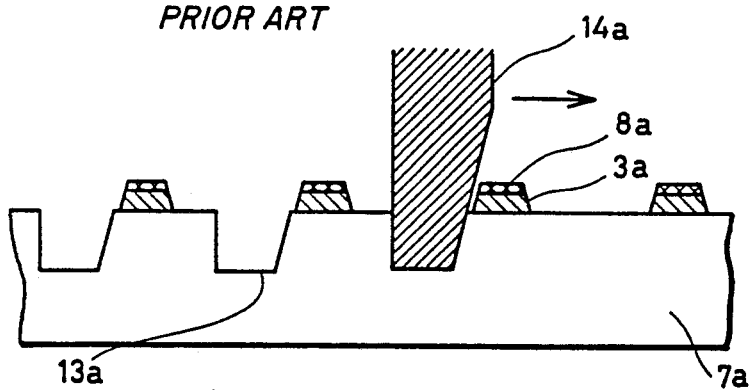
Figure 10B:
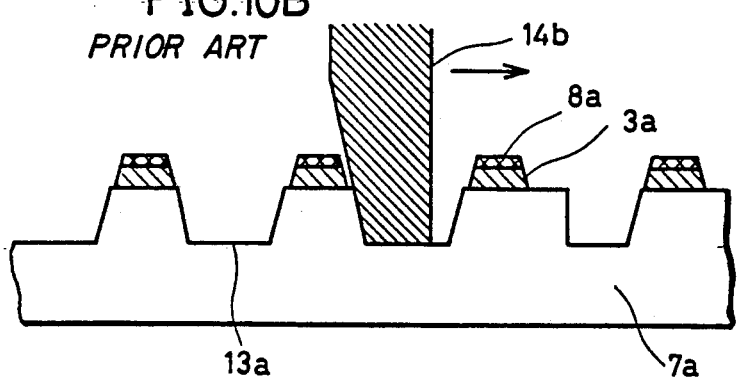

Thereafter gap forming surfaces of the pair of substrates 7a and 7b are precisely abutted with each other in a similar manner to the conventional step shown in FIG. 5, to define a block through glass junction. This block is cut and ground/polished, thereby to complete a magnetic head shown in FIG. 14.

Figure 14:
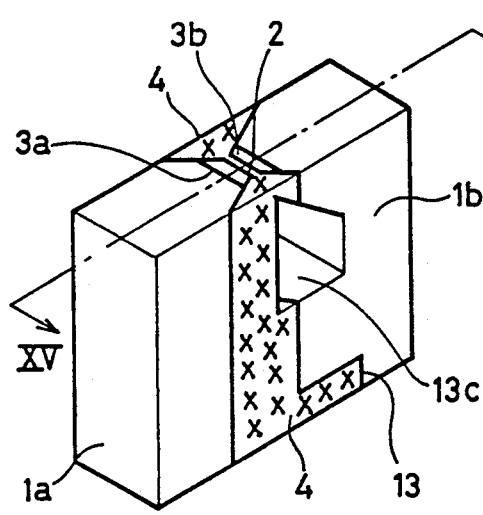
FIG. 14 is a perspective view showing the appearance of a magnetic head according to the present invention.
Figure 15:
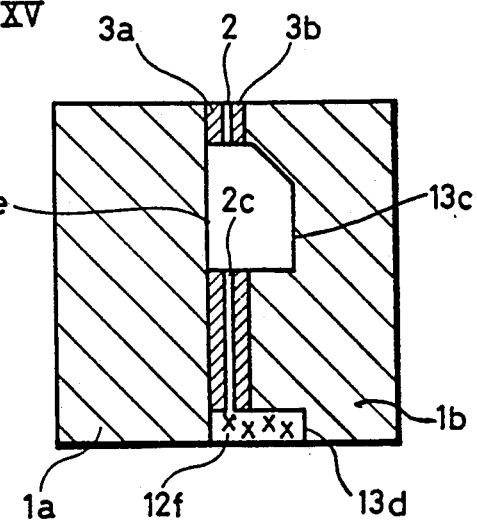
FIG. 15 is a sectional view taken along the line XV—XV in FIG. 14, showing the magnetic head manufactured by the method according to the first embodiment of the present invention.

FIG. 14 is a perspective view showing the appearance of the magnetic head manufactured by the aforementioned method, and FIG. 15 is a sectional view taken along the line XV—XV in FIG. 14. In this magnetic head, the second strain parting grooves 12e and 12f are provided, within the gap forming surface of the first magnetic core half 1a, in a portion opposite to the coil groove 13c and a portion opposite to the glass rod receiving groove 13b of the second magnetic core half 1b respectively. Thus, no ferromagnetic metal thin film 3a is formed but the surface of the magnetic core half 1a is exposed in these portions.

According to the aforementioned manufacturing method, the ferromagnetic metal thin film 3a provided on the first substrate 7a is parted by the second strain parting grooves 12e and 12f into narrow ranges, similarly to the second substrate 7b. Therefore, it is possible to part various strain components which result from condition changes caused before and after film formation by difference in thermal expansion coefficient between the substrate 7a and the ferromagnetic metal thin film 3a etc. Thus, even if mechanical recessing is performed in a later step, influence exerted on the ferromagnetic metal thin film by impact or vibration caused in such recessing can be reduced. Consequently, it is possible to reduce the rate of cracking or separation caused in the ferromagnetic metal thin film 3a.

When heat-resistant thin films are interposed between magnetic core halves and ferromagnetic metal thin films in a conventional method of manufacturing a magnetic head, adhesion of the ferromagnetic metal thin films is reduced as compared with that of a magnetic head having no such heat-resistant thin films, to easily cause separation. In the aforementioned manufacturing method according to the present invention, on the other hand, the rate of separation of the ferromagnetic metal thin films 3a and 3b is reduced even if heat-resistant thin films are interposed in order to suppress occurrence of false gaps. The manufacturing yield of magnetic heads is extremely improved to 95 to 100%, by such reduction in the rate of separation of the ferromagnetic metal thin films 3a and 3b.

In the aforementioned method of manufacturing a magnetic head, separation of the ferromagnetic metal thin film 3a can be also sufficiently prevented by providing the second strain parting grooves 12e and 12f in portions other than those opposite to the first strain parting grooves 12c and 12d of the second substrate 7b. In the completed magnetic head, however, a strain parting groove formed in a back gap portion 2c shown in FIG. 15, for example, causes difficulty in flowing of a magnetic flux, to degrade the magnetic property. That is, separation of the ferromagnetic metal thin film 3a can be prevented without degrading the magnetic property by forming the second strain parting grooves 12e and 12f in the portions opposite to the coil groove 13c and the glass rod receiving groove 13d, to pass no magnetic flux.

A second embodiment of the method of manufacturing a magnetic head according to the present invention is now described in detail.

FIGS. 16A to 17B are perspective views sequentially showing steps in the method of manufacturing a magnetic head according to the second embodiment of the present invention.

Figure 1:
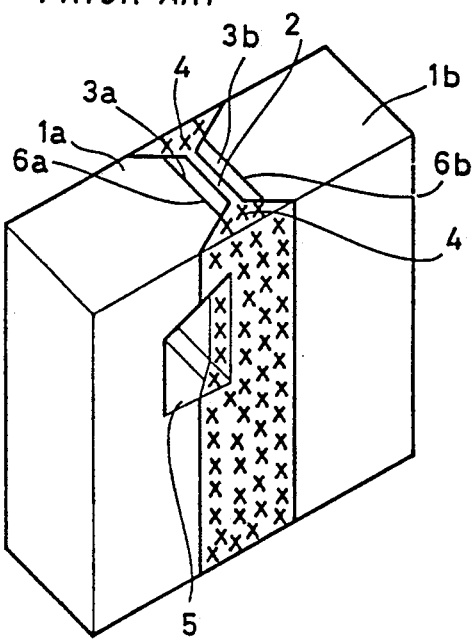
FIGS. 1 and 2 are perspective views showing appearances of conventional magnetic heads respectively.
Figure 2:
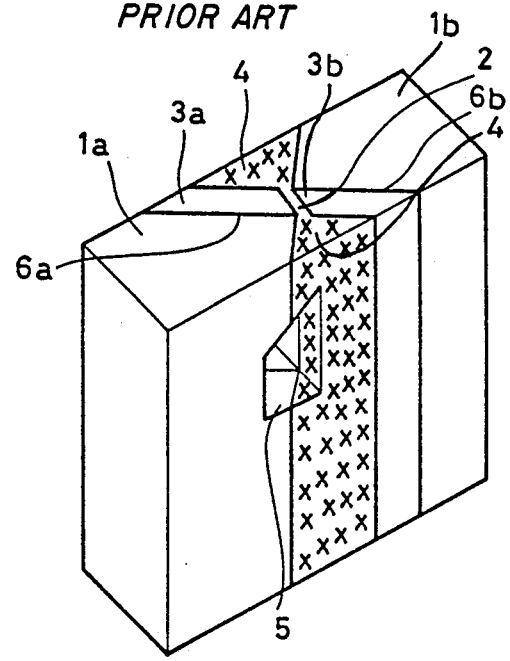
Figure 3A:
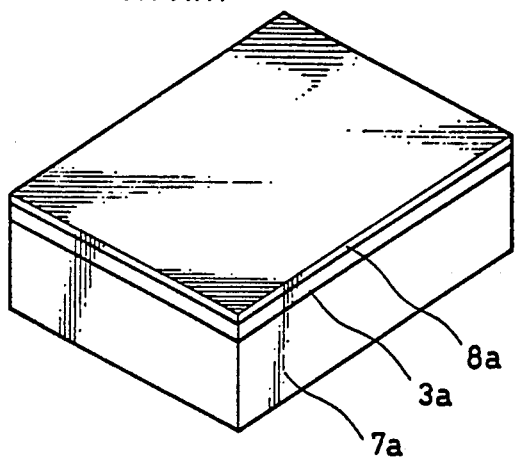
FIGS. 3A, 3B, 4A, 4B and 5 are perspective views sequentially showing steps in an exemplary method of manufacturing the conventional magnetic head shown in FIG. 1.
Figure 3B:
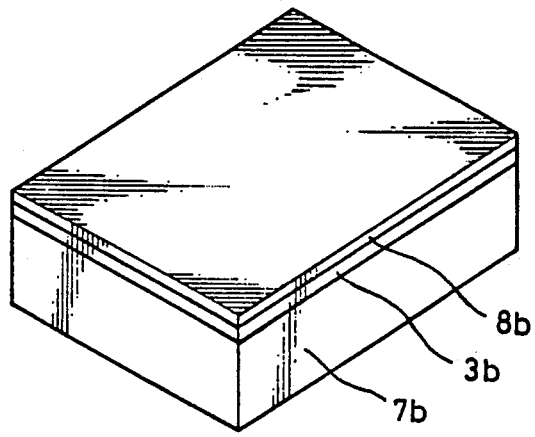
Figure 4A:
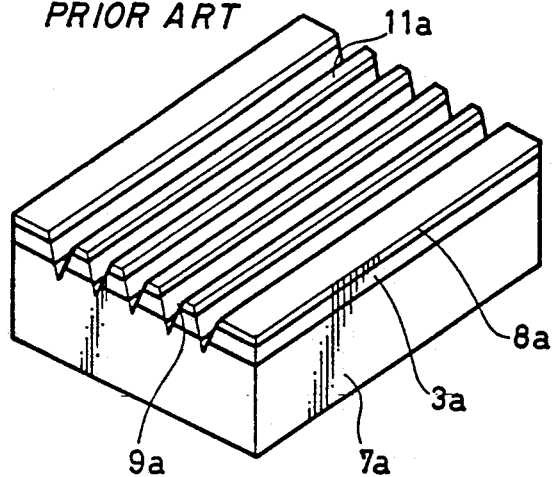
Figure 4B:
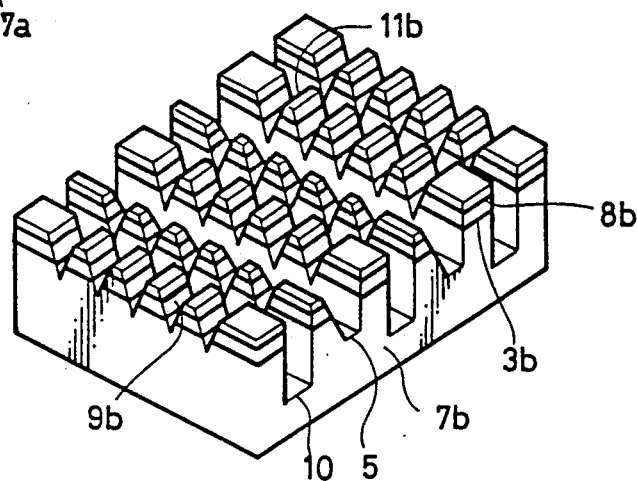
Figure 16A:
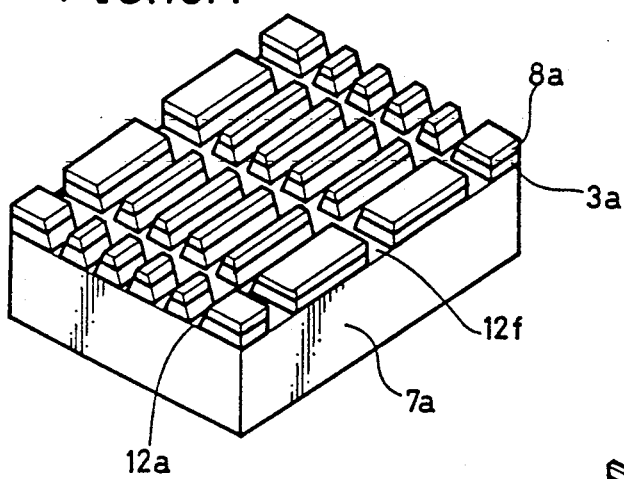
FIGS. 16A, 16B, 17A and 17B are perspective views sequentially showing steps in a method of manufacturing a magnetic head according to a second embodiment of the present invention.
Figure 16B:
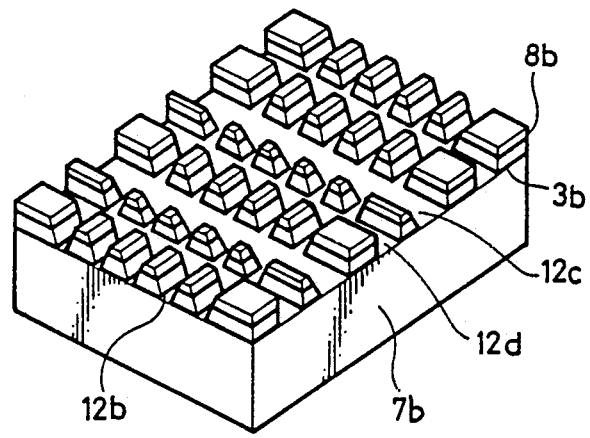

Similarly to the first embodiment, ferromagnetic metal thin films 3a an 3b and nonmagnetic thin films 8a and 8b are provided on surfaces of a pair of substrates 7a and 7b for forming magnetic gaps. Thereafter first and second strain parting grooves 12a, 12b, 12c, 12d and 12f are formed by ion beam etching respectively, as shown in FIGS. 16A and 16B. In the second embodiment, the first substrate 7a is provided with no second strain parting grooves (first strain parting grooves 12e shown in FIG. 2A), which are opposite to the first strain parting grooves 12c corresponding to the portions of the second substrate 7b to be provided with coil grooves.

Figure 17A:
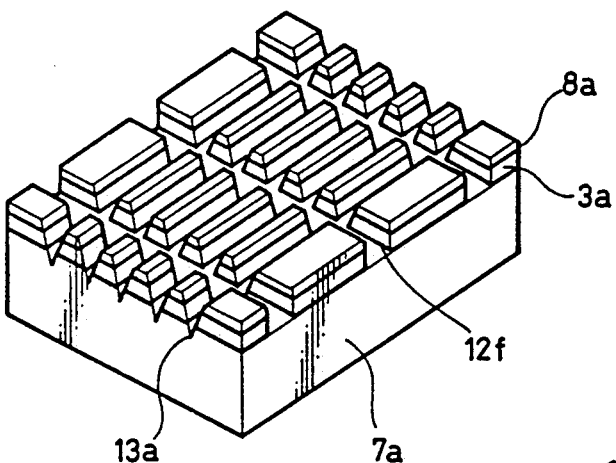
Figure 17B:
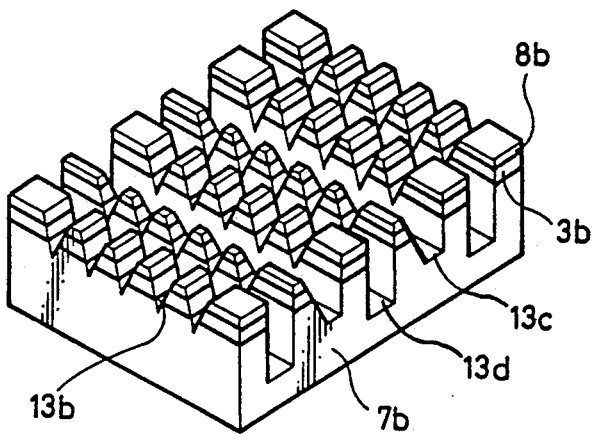

Thereafter track width regulating grooves 13a and 3b, coil grooves 13c and glass rod receiving grooves 13d are formed in the substrates 7a and 7b similarly to the first embodiment, as shown in FIGS. 17A and 17B. The substrates 7a and 7b are joined with each other in a similar manner to the conventional step shown in FIG. 5, and thereafter cut and ground/polished, thereby to complete a magnetic head.

Figure 18:
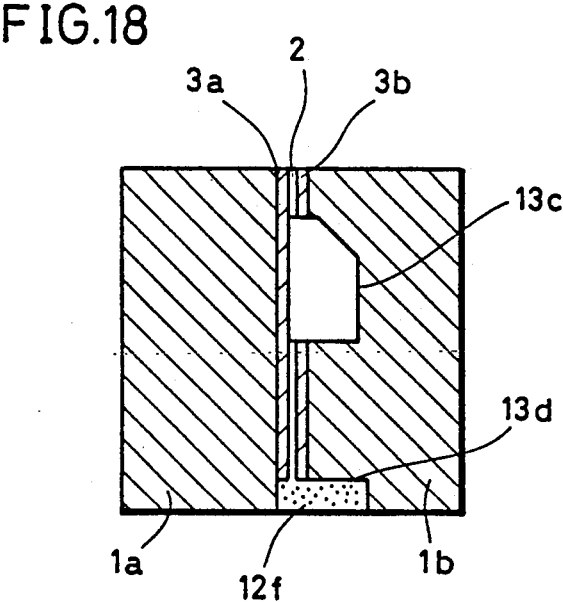
FIG. 18 is a sectional view showing a magnetic head manufactured by the method according to the second embodiment of the present invention.

FIG. 18 is a sectional view for illustrating the magnetic head manufactured in the second embodiment. According to this figure, a ferromagnetic metal thin film 3a is parted by a second strain parting groove 12f on a gap forming surface part of a magnetic core half 1a which is opposite to a glass rod receiving groove 13d. Another gap forming surface part of the magnetic core half 1a, which is opposite to a coil groove 13c, is provided with the ferromagnetic metal thin film 3a.

In the aforementioned manufacturing method according to the second embodiment, an effect of preventing film separation is inferior to that of the first embodiment. However, strain components existing in the ferromagnetic metal thin films 3a and 3b can be sufficiently parted by the first and second strain parting grooves 12a, 12b, 12c, 12d and 12f. Also when heat-resistant thin films are interposed, the degree of separation of the ferromagnetic metal thin films 3a and 3b is reduced and the manufacturing yield is improved.

In the aforementioned second embodiment, the second strain parting grooves are provided not in portions opposite to those provided with the coil grooves but in portions opposite to those provided with the glass rod receiving grooves. However, such second strain parting grooves may be formed in the portions opposite to those provided with the coil grooves, but not in the portions opposite to those provided with the glass rod receiving grooves.

Figure 19:
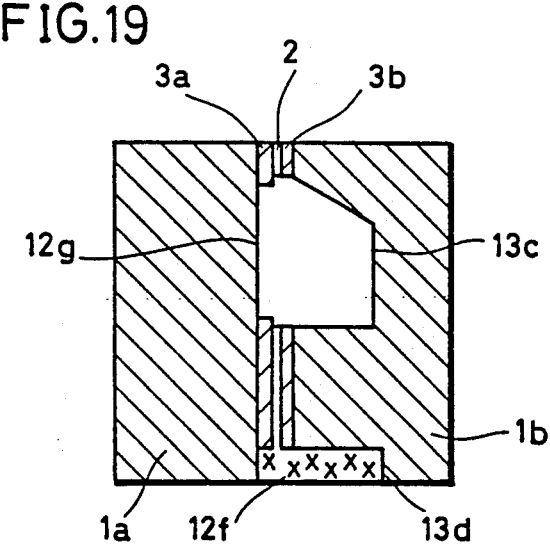
FIGS. 19 and 20 are sectional views showing magnetic heads according to further embodiments of the present invention.
Figure 20:
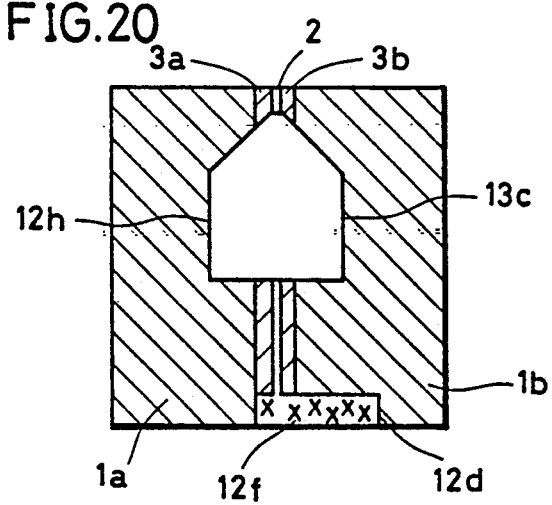
Figure 21:
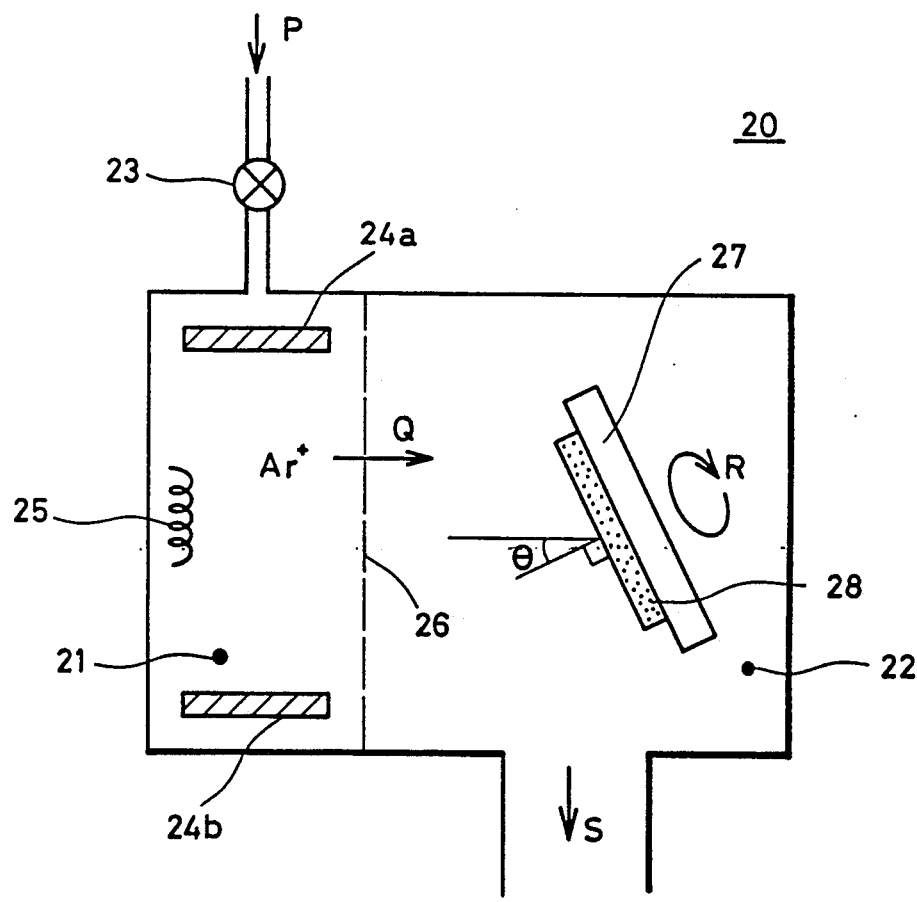
FIG. 21 is a typical diagram showing the structure of an ion beam etching apparatus which is employed in the inventive method of manufacturing a magnetic head.

In addition to the aforementioned embodiments, the present invention may be adapted to manufacture a magnetic head in which a strain parting groove 12g smaller than a coil groove 13c is formed in a portion opposite to the coil groove 13c as shown in FIG. 19, or that having a strain parting groove 12h which is formed in a portion opposite to a coil groove 13c to serve as another coil groove, as shown in FIG. 20. In the latter case, the strain parting groove 12h is formed through mechanical working by a dicing saw or the like, after ion beam etching processing. Further, although the nonmagnetic thin films 8a and 8b are formed continuously to formation of the ferromagnetic metal thin films 3a and 3b in each of the aforementioned embodiments, such nonmagnetic thin films may be formed after the recessing processing. In the inventive method of manufacturing a magnetic head, the ion beam etching step is carried out as follows: FIG. 21 is a typical diagram showing the structure of an ion beam etching apparatus 20, which is formed by a discharge chamber 21 and a sample chamber 22. Argon gas is introduced into the discharge chamber 21 through a flow regulating valve 23 along an arrow P. The discharge chamber 21 is provided therein with an opposite pair of anodes 24a and 24b and a cathode filament 25. The sample chamber 22 is provided therein with a sample substrate 28 to be etched, which is placed on a substrate holder 27 rotating along an arrow R. The discharge chamber 21 and the sample chamber 22 are evacuated in a direction S.

In the ion beam etching apparatus 20 having the aforementioned structure, thermions emitted from the cathode filament 25 in a vacuum of about $10^{-4}$ Torr. collide with Ar atoms before reaching the anodes 24a and 24b. Thus, $Ar^+$ plasmas are formed and $Ar^+$ is extracted from the discharge chamber 21 along an arrow Q, by negative voltage of hundreds of volts applied to a grid 26. The surface of the sample substrate 28 provided in the sample chamber 22 is struck by such $Ar^+$, having kinetic energy of hundreds of electron volts, to be physically etched.

In this case, the speed of etching and a taper configuration of a pattern end portion extremely depend on the angle of incidence of Ar+ with respect to the surface of the substrate. According to this embodiment, the angle θ of incidence is set at about 30°. In order to attain uniformity of the speed of etching and the taper configuration over the entire substrate surface, it is preferable to rotate the substrate while constantly maintaining the angle θ of incidence.

The aforementioned recessing step utilizing a dicing saw is now described in detail. Employed is a disc-type grindstone, which is formed by compacting abrasive grains of diamond or the like by a binder of resin or a metal. Its disc-shaped outer peripheral portion, i.e., the cutting edge, is shaped into a desired configuration. This grindstone is rotated at about $10^4$ r.p.m. and moved at about 1 mm/sec. while pressing a substrate to be worked against the same in a direction perpendicular to its axis of rotation, thereby to cut a groove in the substrate.

Description is now made on a third embodiment of the present invention, which applies a manufacturing step of selectively forming a ferromagnetic metal thin film on a substrate for providing a magnetic core half to expose a prescribed region of a gap forming surface, in the aforementioned first or second embodiment. FIGS. 22A to 25B are side elevational views sequentially showing steps in a method of manufacturing a magnetic head according to the third embodiment of the present invention. FIGS. 22A, 23A, 24A and 25A are side elevational views illustrating the substrate of FIG. 11B seen from a direction A, and FIGS. 22B, 23B, 24B and 25B are side elevational views illustrating the substrate of FIG. 11B seen from a direction B.

Figure 22A:
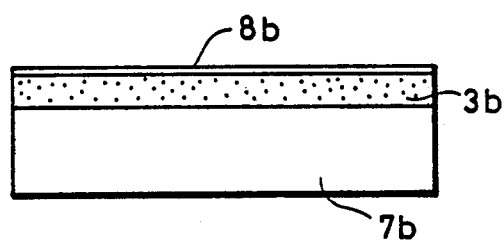
FIGS. 22A, 22B, 23A, 23B, 24A, 24B, 25A and 25B are side elevational views sequentially showing steps in a method of manufacturing a magnetic head according to a third embodiment of the present invention.
Figure 22B:
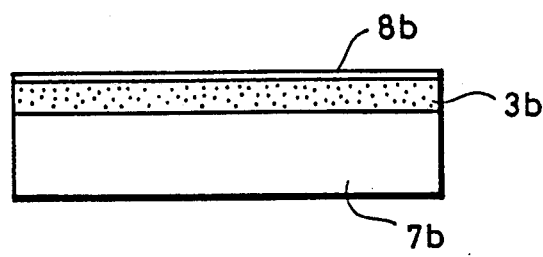

Referring to FIGS. 22A and 22B, first and second substrates 7a and 7b are prepared from ferromagnetic oxide such as Mn-Zn ferrite, so that surfaces for forming magnetic gaps are subjected to specular polishing. It is noted that these figures show only a step relating to the second substrate 7b. A ferromagnetic metal thin film 3b of Sendust or the like is formed on the surface of the substrate 7b for forming a gap, to be about several micrometers in thickness, by sputtering or the like. Thereafter a nonmagnetic thin film 8b of $SiO_2$ or the like is formed on the ferromagnetic metal thin film 3b, to be about several nanometers in thickness, by sputtering or the like.

Figure 23A:
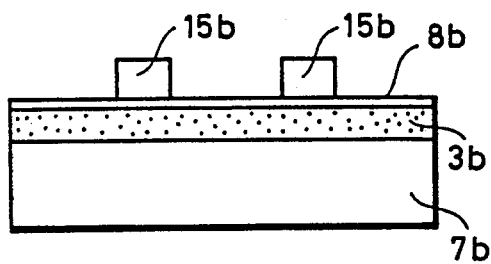
Figure 23B:
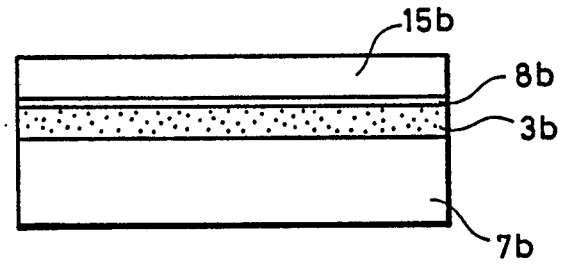

Then, resist patterns 15b are formed on portions of the nonmagnetic thin film 8b corresponding to narrow track width $T_N$, as shown in FIGS. 23A and 23B.

Figure 24A:
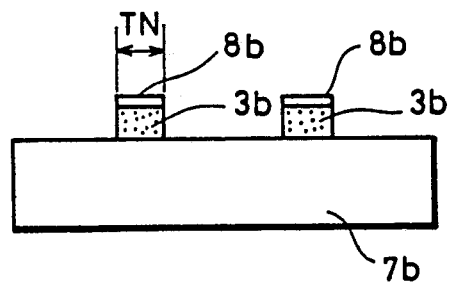
Figure 24B:
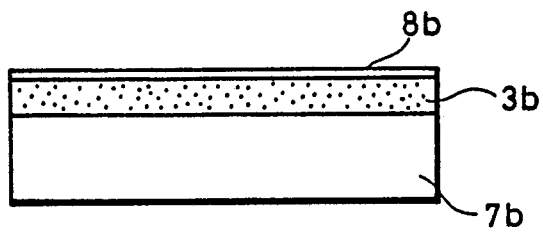

Thereafter unnecessary portions of the nonmagnetic thin film 8b and the ferromagnetic metal thin film 3b are selectively removed by ion beam etching along the resist patterns 15b, as shown in FIGS. 24A and 24B. In this embodiment, depth of ion beam etching is equal to the total of thickness values of the ferromagnetic metal thin film 3b and the nonmagnetic thin film 8b.

Figure 25A:
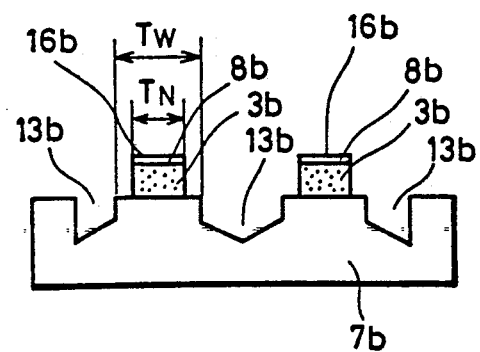
Figure 25B:
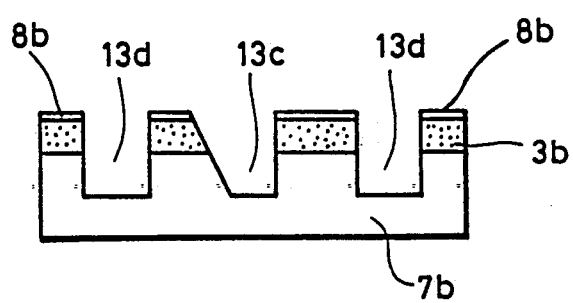

As shown in FIGS. 25A and 25B, track width regulating grooves 13b for regulating track width $T_W$ of wide gap portions are formed on exposed gap forming surface parts of the substrate 7b by mechanical working through a dicing saw. At this time, similar mechanical processing is performed on the surface of the second substrate 7b for forming gaps within the pair of substrates 7a and 7b, thereby to form a coil groove 13c and glass rod receiving grooves 13d.

Finally the pair of substrates 7a and 7b worked in the above manufacturing steps are so abutted that narrow gap portion forming surfaces 16a and 16b thereof are precisely opposite to each other, to be glass-joined. A block thus formed is cut and ground/polished, in a similar manner to the conventional step shown in FIG. 5. Thus completed is a magnetic head having a tape contact surface, as shown in FIG. 26.

Figure 26:
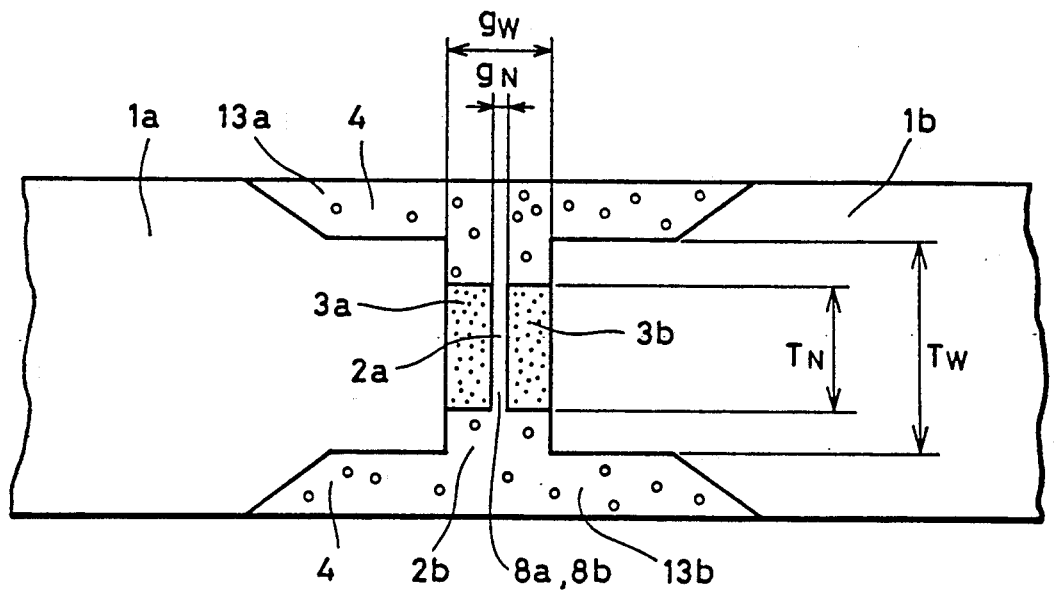
FIG. 26 is a partial plan view showing a tape contact surface of a magnetic head manufactured by the method according to the third embodiment of the present invention.

Referring to FIG. 26, only prescribed regions of gap forming surfaces are exposed and ferromagnetic thin films are selectively formed. Wide gap portions 2b defining track width $T_W$ are formed by track width regulating grooves 13a and 13b. Between the wide gap portions 2b, a narrow gap portion 2a having track width $T_N$ is defined by ferromagnetic metal thin films 3a and 3b, which are opposite to each other. Gap length $g_N$ of the narrow gap portion 2a is smaller than ½ of the minimum recording wavelength of a signal to be detected, such as a video signal or a PCM signal. Gap length $g_W$ of the wide gap portions 2b is larger than ½ of the maximum recording wavelength of the said signal to be detected, and smaller than ½ of the minimum recording length of a pilot signal.

In general, frequency values f and recording wavelength values λ of a video signal, a PCM signal and a pilot signal for 8 mm VTR or DAT are within ranges shown in Table 1. Referring to Table 1, symbol γ represents relative travelling speed values between heads and tapes. Relation $\lambda = \gamma/f$ holds.

TABLE 1

|  |  | γ(m/s) | f(MHz) | λ(μm) |
| --- | --- | --- | --- | --- |
| 8 mm VTR | Video Signal | 3.8 | 0.5~5 | 0.8~8 |
|  | Pilot Signal | 3.8 | 0.1 | 38 |
| R-DAT | PCM Signal | 3.1 | 1.2~4.7 | 0.66~2.6 |
|  | Pilot Signal | 3.1 | 0.13 | 24 |

When the magnetic head according to this embodiment is applied to 8 mm VTR or R-DAT, the gap length $g_N$ of the narrow gap portion 2a and the gap length $g_W$ of the wide gap portions 2b may be set in the values shown in Table 2, for example.

TABLE 2

|  | $g_N$ (μm) | $g_W$ (μm) |
| --- | --- | --- |
| 8 mm VTR | 0.3 | 10 |
| R-DAT | 0.3 | 8 |

The track width $T_N$ of the narrow gap portion 2a is within a range of 1 to 1.5 times the track pitch. The track width $T_W$ of the wide gap portions 2b is within a range of 1 to 1.5 times the track width $T_N$ of the narrow gap portion 2a.

Figure 27:
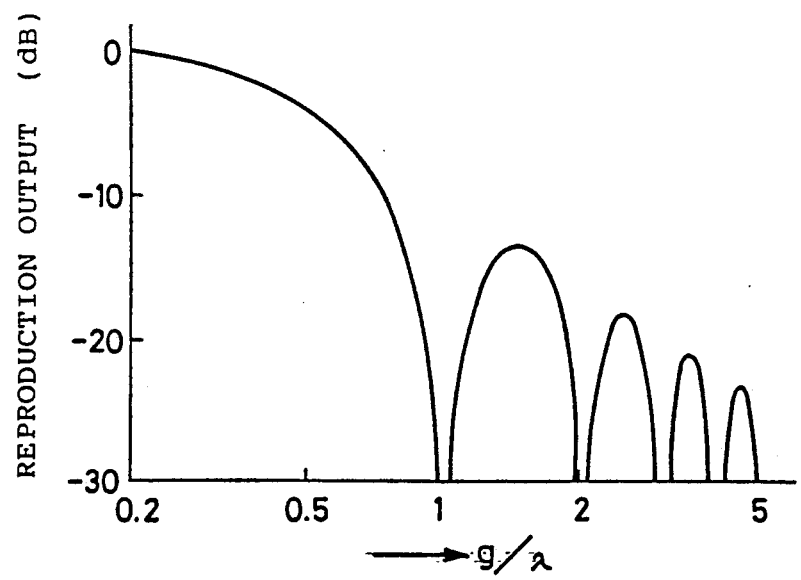
FIG. 27 illustrates the reproduction output characteristic of a magnetic head.

FIG. 27 generally shows relation between reproduction output by gap loss and gap length/wavelength (g/λ). It is understood that reproduction can be efficiently performed when the gap length is smaller than ½ of the wavelength, while reproduction output is extremely lowered if the gap length is larger than ½ of the wavelength.

In the magnetic head manufactured according to this embodiment, the narrow gap portion 2a can efficiently reproduce a video signal, a PCM signal, a pilot signal and the like, which are recorded on a scan track. On the other hand, the wide gap portions 2b efficiently reproduce only a pilot signal recorded on a track adjacent to the scan track, and hardly reproduce a video signal and a PCM signal also recorded on the adjacent track. Thus, the magnetic head of this embodiment can excellently detect a tracking error caused in a pilot system.

Figure 28:
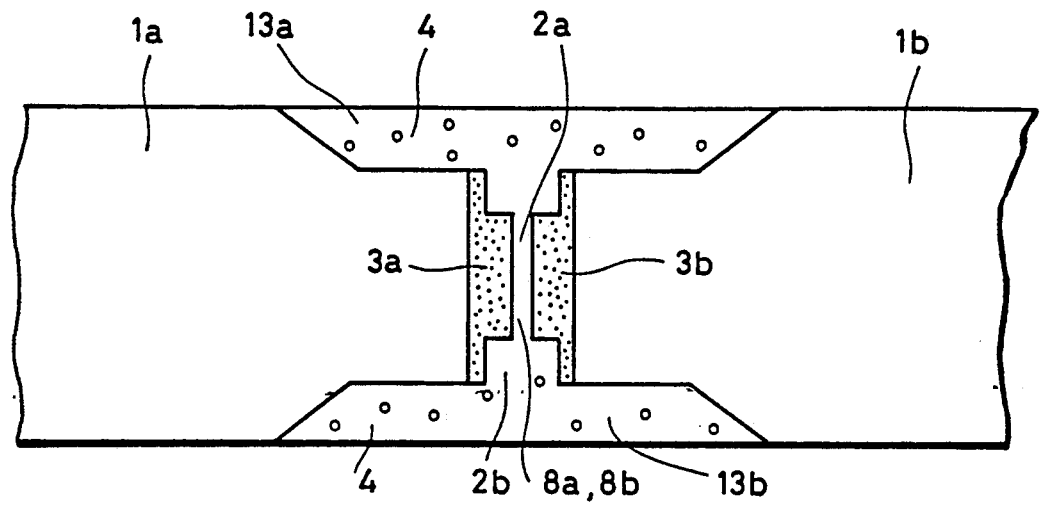
FIGS. 28, 29 and 30 are partial plan views showing tape contact surfaces of magnetic heads according to other embodiments of the inventive magnetic head.
Figure 29:
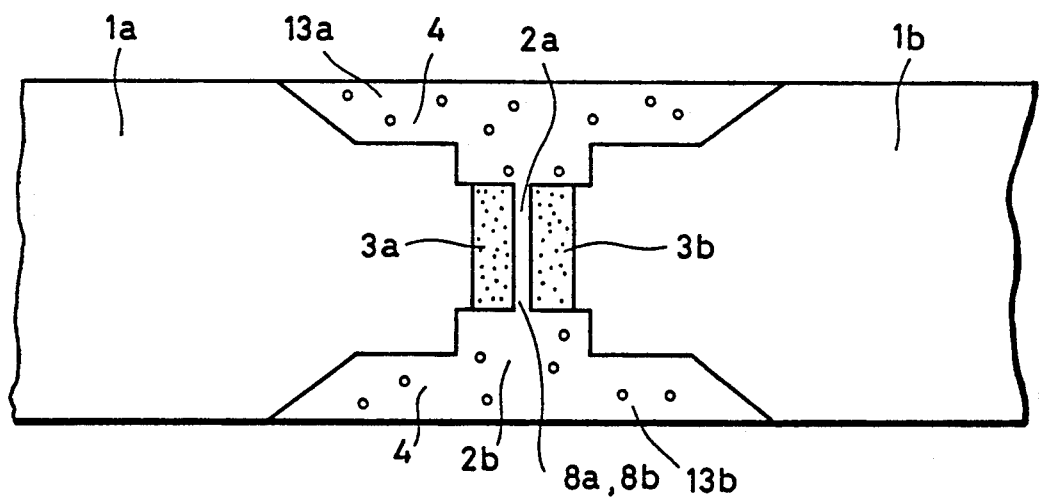

Although the depth of ion beam etching is equal to the total of the thickness values of the ferromagnetic metal thin film and the nonmagnetic thin film, it is not necessarily required to equalize the former to the latter. The ferromagnetic metal thin film may be partially left, or the depth of etching may reach a part of the substrate. FIGS. 28 and 29 show tape contact surfaces of magnetic heads manufactured in such case.

Figure 30:
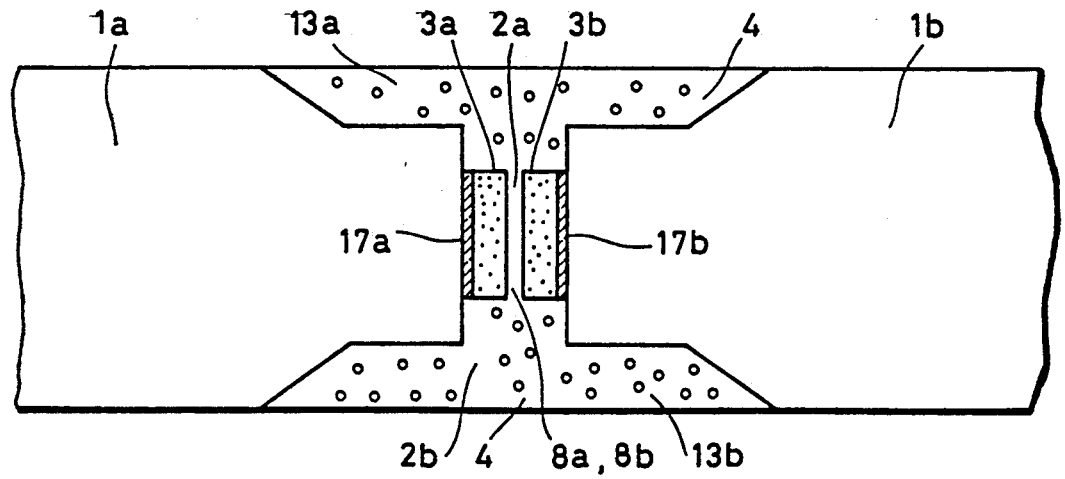

In order to prevent boundary surfaces between the magnetic core halves 1a and 1b and the ferromagnetic metal thin films 3a and 3b from serving as false gaps, heat-resistant thin films 17a and 17b may be interposed in the said boundary surfaces. FIG. 30 shows the tape contact surface of such a magnetic head. In this case, gap forming surfaces of substrates are subjected to chemical etching and reverse sputtering, and thereafter heat-resistant thin films of $SiO_2$ or the like are formed on the said surfaces. Thickness of the heat-resistant thin films 17a and 17b is within a range of at least 1 mm and not more than 1/10 of gap length $T_N$ of a narrow gap portion.

The ferromagnetic metal thin film may not be provided in the vicinity of a magnetic gap. In the magnetic head having a magnetic gap between a pair of magnetic core halves abutted with each other through only a gap spacer, wide gap portions efficiently reproduce only a pilot signal recorded on a track adjacent to the scan track by defining a narrow gap portion between wide gap portions, similarly to the above embodiment. Thus, the magnetic head without the ferromagnetic metal thin film can excellently detect a tracking error caused in a pilot system.

With reference to FIGS. 31 to 37, a fourth embodiment of the inventive method of manufacturing a magnetic head is now described.

Figure 31:
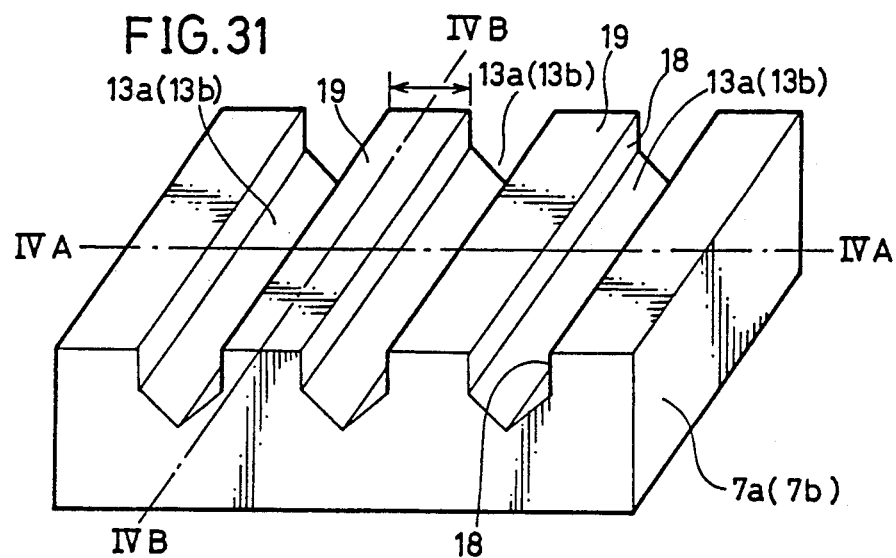
FIGS. 31, 32, 33, 34, 35, 36 and 37 are perspective and sectional views sequentially showing steps in a method of manufacturing a magnetic head according to a fourth embodiment of the present invention.

Referring to FIG. 31, track width regulating grooves 13a (13b) are formed on a gap forming surface of a substrate 7a (7b) which is prepared from ferromagnetic oxide such as Mn-Zn monocrystal ferrite, by mechanical working through a dicing saw. The track width regulating grooves 13a (13b) are so formed that surface parts 19 to be provided with a ferromagnetic thin film have width W (e.g., 26 μm), which is slightly larger than desired track width. Upper side surfaces 18 of the track width regulating grooves 13a (13b) are orthogonal to the gap forming surface of the substrate 7a (7b), while lower portions of the track width regulating grooves 13a (13b) are V-shaped in section.

Figure 32:
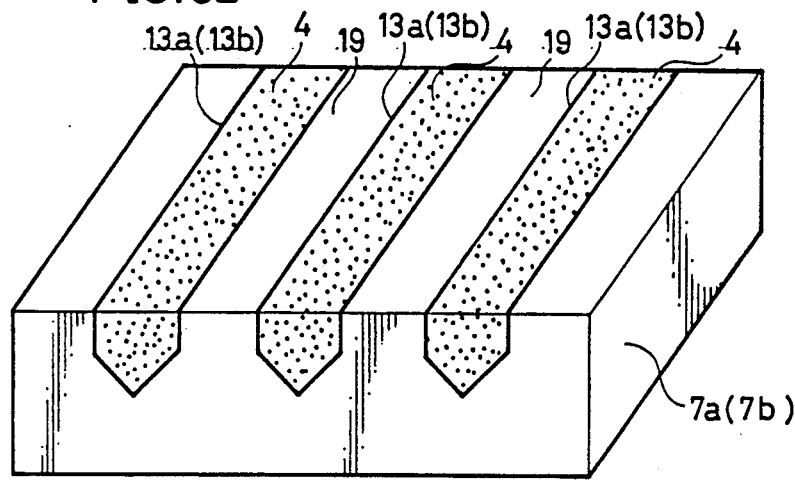

Then, as shown in FIG. 32, a glass plate is brought into pressure contact with the gap forming surface of the substrate 7a (7b) and heated to 470° to 500° C. Thus, glass members 4 are filled in the track width regulating grooves 13a (13b). In this state, glass members are also adhered to the surface parts 19 to be provided with a ferromagnetic thin film. Thereafter surface polishing is performed until the surface parts 19 to be provided with a ferromagnetic thin film are exposed from the gap forming surface of the substrate 7a (7b). Since the upper side surfaces 18 of the track width regulating grooves 13a (13b) are orthogonal to the gap forming surface of the substrate 7a (7b), the width W of the surface parts 19 to be provided with a ferromagnetic thin film can be constantly maintained with no regard to the amount of such polishing.

Figure 33:
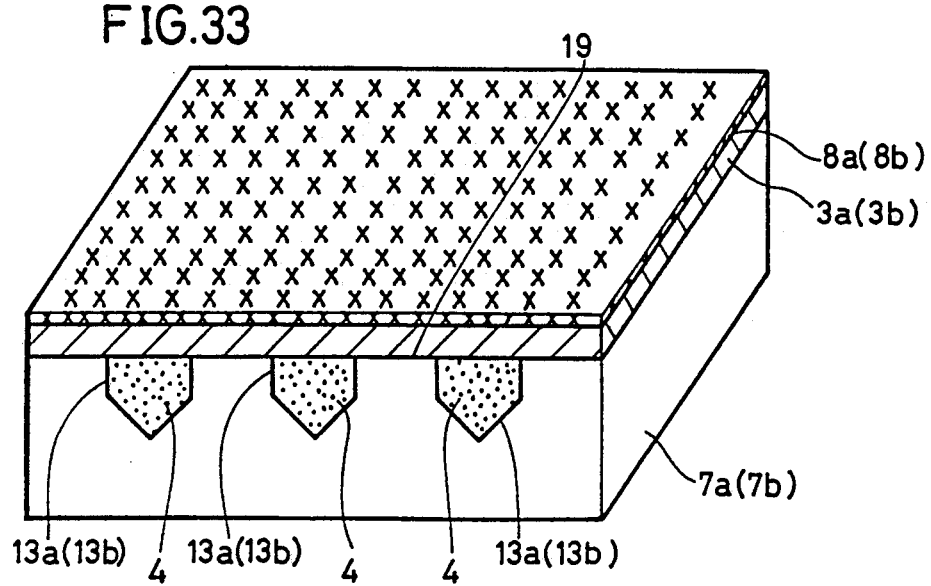

Then, as shown in FIG. 33, a ferromagnetic metal thin film 3a (3b) of Sendust or the like and a nonmagnetic thin film 8a (8b) of $SiO_2$ or the like are formed by sputtering. The thickness of the ferromagnetic metal thin film 3a (3b) is about 5 μm, and that of the nonmagnetic thin film 8a (8b) is set at ½ of gap length. A heat-resistant thin film (not shown) may be formed between the substrate 7a (7b) and the ferromagnetic metal thin film 3a (3b).

Figure 34:
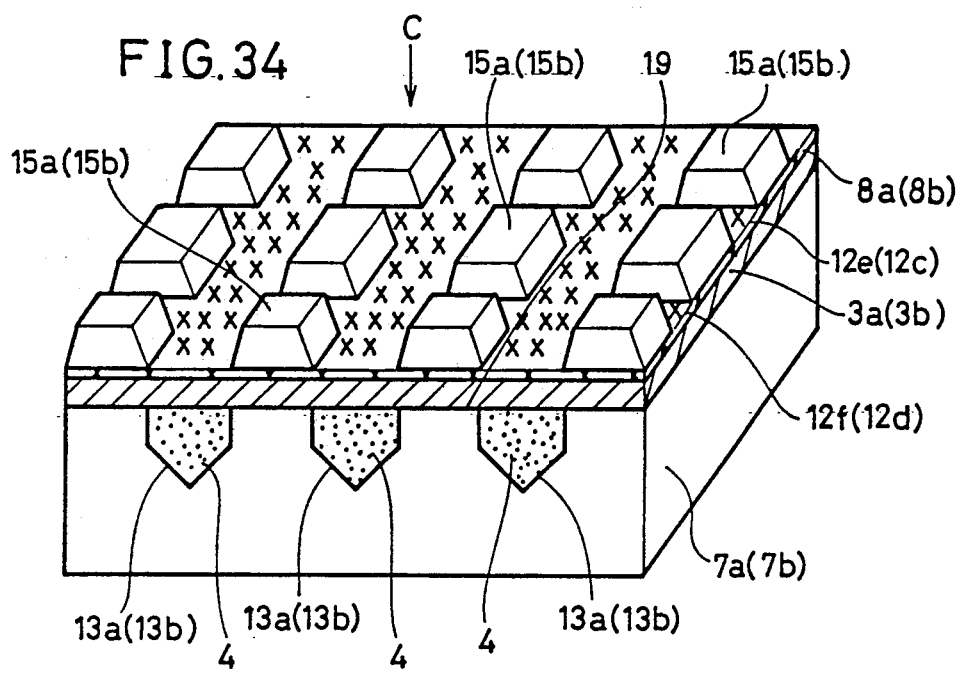

Then, resist patterns 15a (15b) are formed on the nonmagnetic thin film 8a (8b) by photolithography as shown in FIG. 34, in order to selectively remove the nonmagnetic thin film 8a (8b) and the ferromagnetic metal thin film 3a (3b). The resist patterns 15a (15b) are not formed portions 12e and 12f (12c and 12d) of the substrate 7a (7b) to be provided with a coil groove and glass rod receiving grooves (or those opposite to the said portions).

Figure 40A:
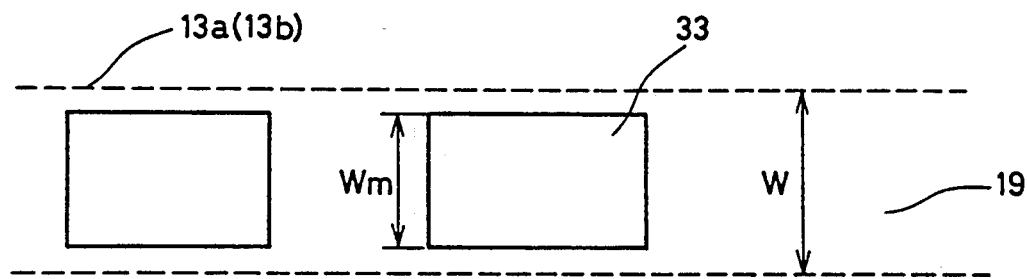
FIGS. 40A and 40B are partial plan views showing masking patterns employed in the manufacturing step shown in FIG. 34.
Figure 40B:
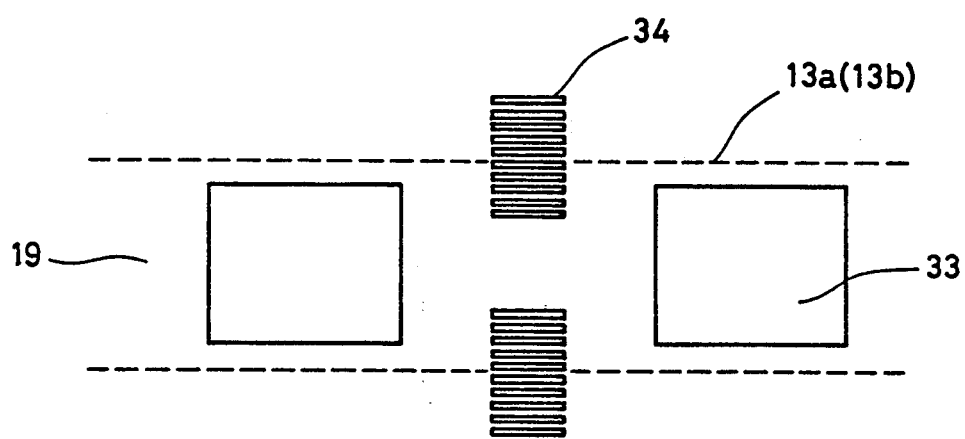

FIGS. 40A and 40B show masking patterns, which are employed in the step of forming the resist patterns 15a (15b) for aligning photomasks on the gap forming surface of the substrate 7a (7b) from a direction C. Referring to FIG. 40A, masking patterns 33 are aligned to be substantially centrally positioned with respect to both side surfaces of a track width regulating groove 13a (13b). It is easy to align the masking patterns 33 having width Wm of 22 μm with a thin film forming surface part 19 having width W of 26 μm, for example, so far as displacement of about 1 to 2 μm is allowed. In order to perform such alignment in high accuracy, on the other hand, the masking patterns shown in FIG. 40B are employed. Referring to FIG. 40B, provided are masking patterns 33 for thin film formation and marker patterns 34 for registration. The marker patterns 34 for registration are aligned with side surfaces of a track width regulating groove 13a (13b), thereby to precisely locate the masking patterns 33 on central positions of a thin film forming surface part 19.

Figure 35:
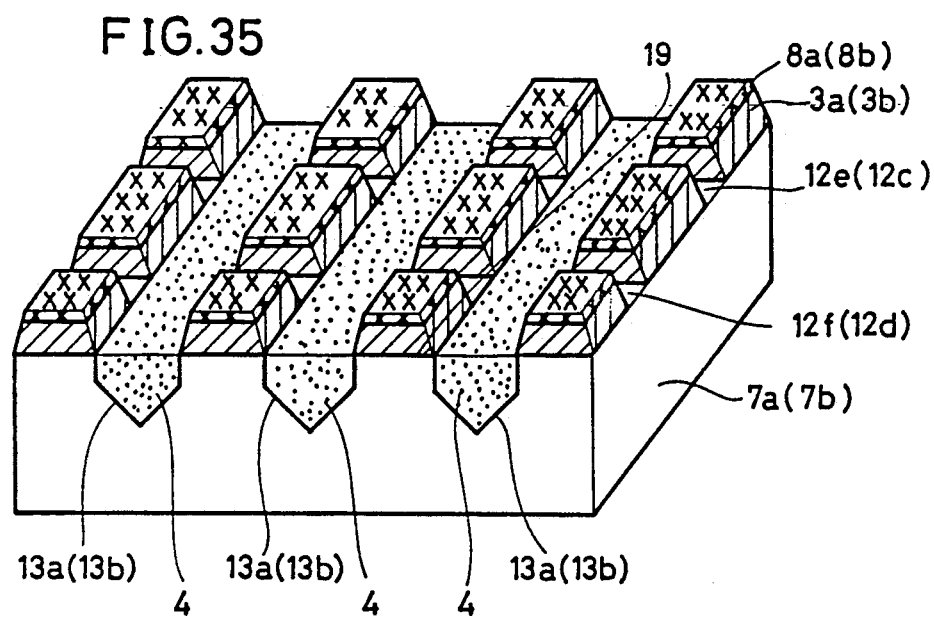
Figure 36:
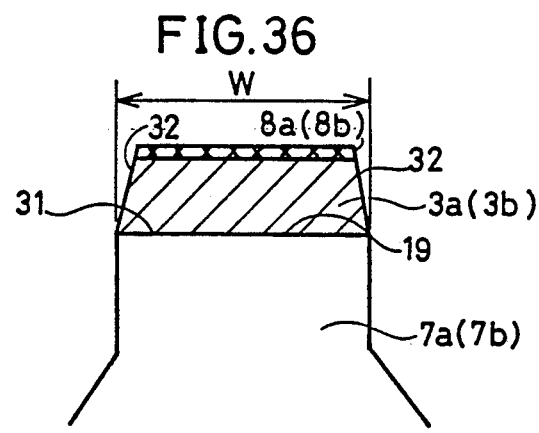

Then, as shown in FIG. 35, the nonmagnetic thin film 8a (8b) and the ferromagnetic metal thin film 3a (3b) are selectively removed by ion beam etching through the resist patterns 15a (15b) serving as masks. Thus, only prescribed regions of the substrate 7a (7b) are exposed while the ferromagnetic metal thin film 3a (3b) and the nonmagnetic thin film 8a (8b) are partially left only in gap abutting portions. As shown in FIG. 36, each remaining part of the ferromagnetic metal thin film 3a (3b) has a bottom surface 31, the width of which is substantially equal to the width W of the thin film forming surface part 19. The angle of inclination of side surfaces of the ferromagnetic metal thin film 3a (3b) can be adjusted by appropriately selecting the angle of incidence of beams in ion beam etching. Thus, the width of the bottom surface 31 can be controlled at a prescribed value.

Figure 37:
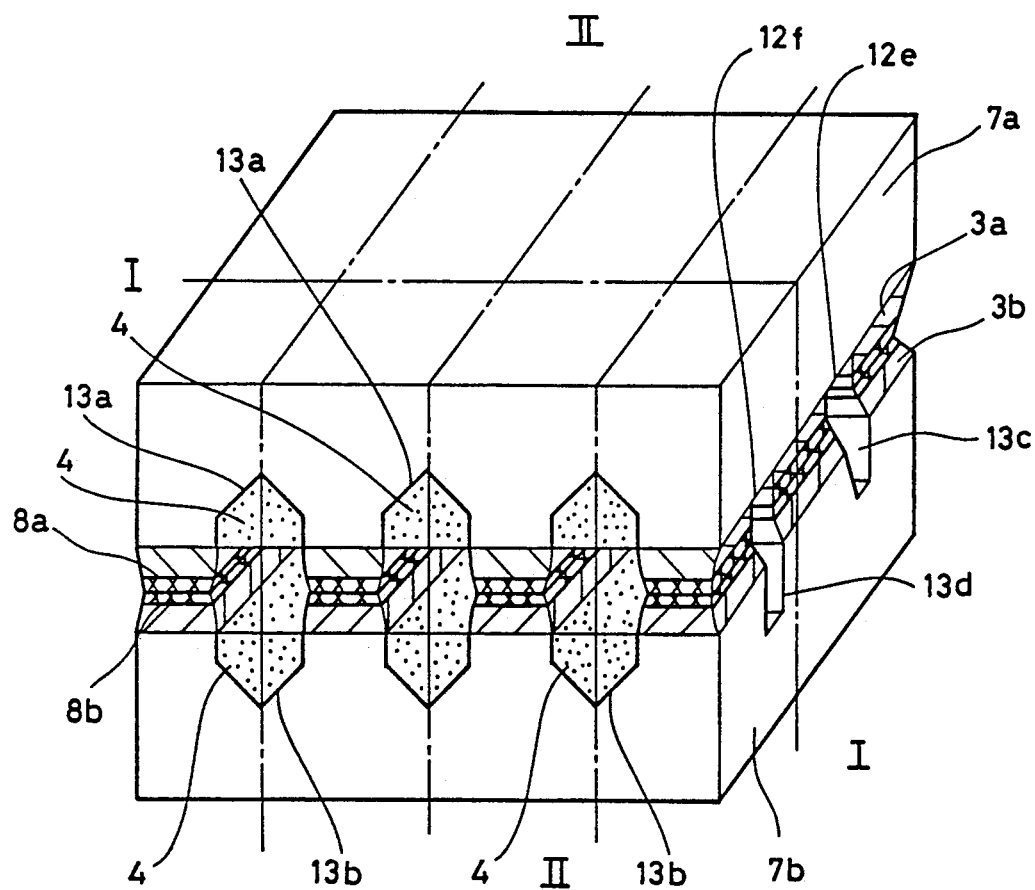

A pair of substrates 7a and 7b, which are worked as shown in FIG. 35, are prepared. Mechanical working is performed through a dicing saw on a portion 12c to be provided with a coil groove and a portion 12d to be provided with a glass rod receiving groove of one substrate 7b. Thus, a coil groove 13c and a glass rod receiving groove 13d are defined in the substrate 7b. Thereafter the pair of substrates 7a and 7b are abutted with each other in gap abutting portions, as shown in FIG. 37.

Thereafter a glass rod (not shown) is inserted in the glass rod receiving groove 13d and then molten. Thus, the pair of substrates 7a and 7b are joined with each other, to form a block. This block is cut in positions corresponding to the lines I—I and II—II similarly to the conventional case, thereby to form a plurality of head chips.

Figure 38:
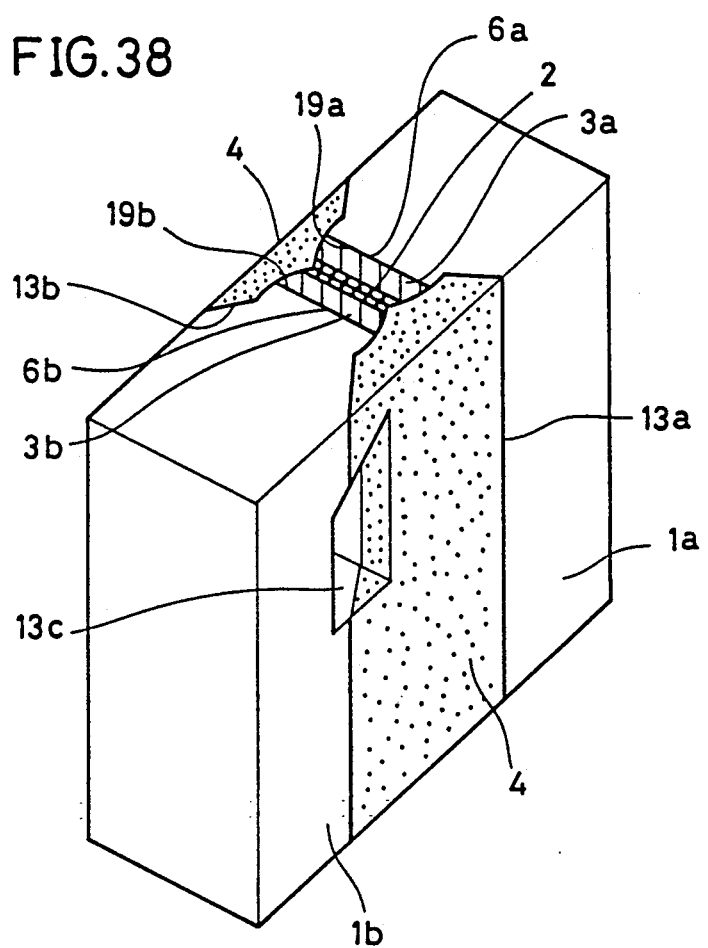
FIG. 38 is a perspective view showing the appearance of a magnetic head manufactured by the method according to the fourth embodiment of the present invention.
Figure 39:
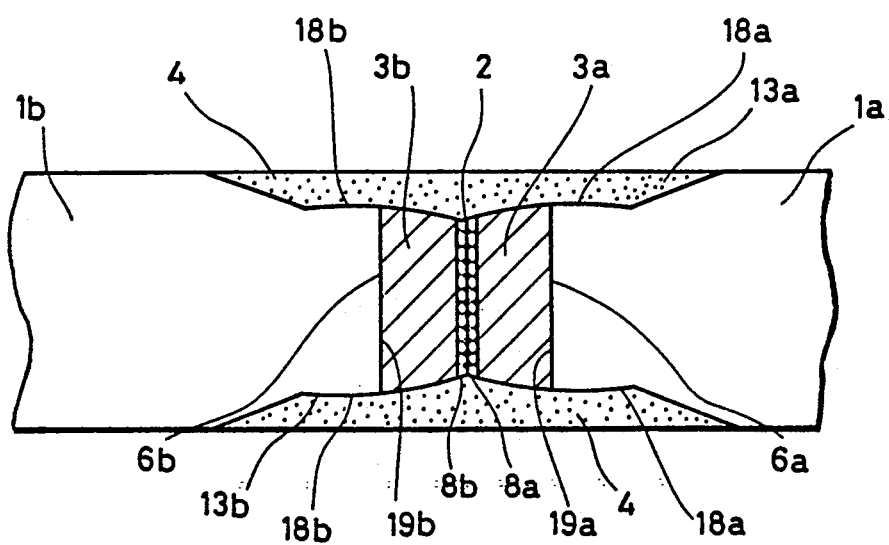
FIG. 39 is a partial plan view showing a tape contact surface of the magnetic head shown in FIG. 38.

FIG. 38 shows the appearance of a magnetic head which is manufactured by the aforementioned method. FIG. 39 is a partial plan view showing a tape contact surface of the magnetic head. Referring to FIGS. 38 and 39, a pair of magnetic core halves 1a and 1b are joined with each other through a glass member 4. Boundary surfaces 6a and 6b between the magnetic core halves 1a and 1b and ferromagnetic metal thin films 3a and 3b are parallel to a magnetic gap 2.

According to the aforementioned method of manufacturing a magnetic head, track width regulating grooves for defining thin film forming surface parts 19 are previously formed to be filled with glass members, and thereafter ferromagnetic metal films 3 and nonmagnetic thin films 8 are formed. Thus, grooves filled with glass members such as the track width regulating grooves, which require precise working, are formed by mechanical working before formation of the thin films. Thus, mechanical recessing requiring no preciseness can be performed after formation of the thin films, without applying impact or vibration to the thin films. Consequently, the ferromagnetic metal films or heat-resistant thin films are prevented from separation caused by recessing. Such an effect is remarkable particularly when heat-resistant thin films are formed for preventing false gaps.

FIGS. 41A to 45A are sectional views taken along the line IVA—IVA in FIG. 31, for sequentially showing the aforementioned steps of manufacturing a magnetic head. FIGS. 41B to 45B are sectional views taken along the line IVB—IVB in FIG. 31, for sequentially showing the said steps. With reference to these figures, description is now made on manufacturing steps in case of working a depth end regulating groove for a coil groove hole.

Figure 41A:
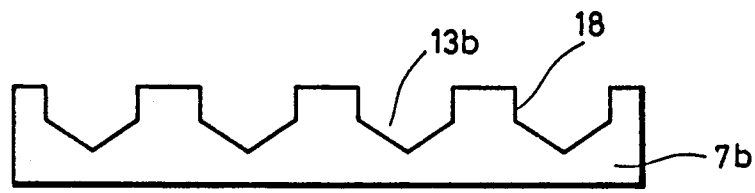
FIGS. 41A, 41B, 42A, 42B, 43A, 43B, 44A, 44B, 45A and 45B are sectional views sequentially showing manufacturing steps in case of forming a depth end regulating groove for a coil groove hole in the manufacturing steps shown in FIGS. 31 to 35.
Figure 42A:
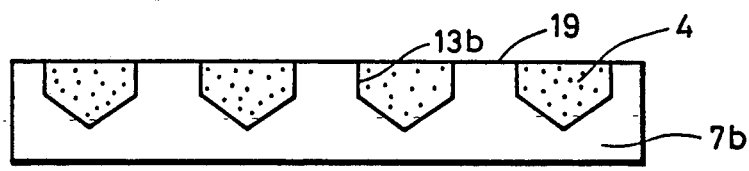
Figure 43A:
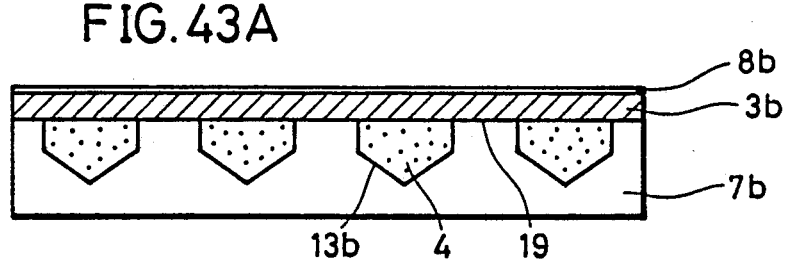
Figure 44A:
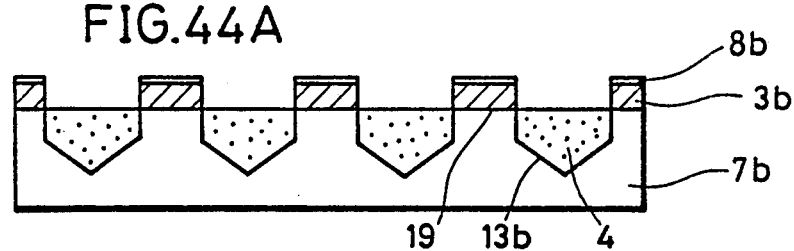
Figure 45A:
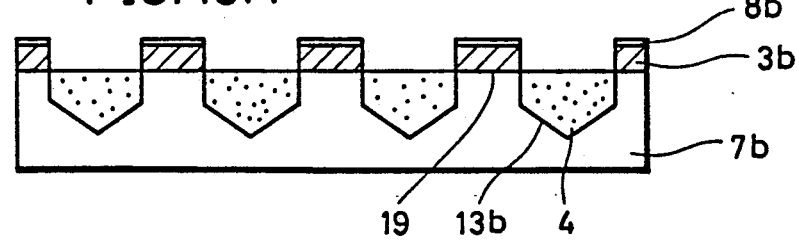
Figure 41B:
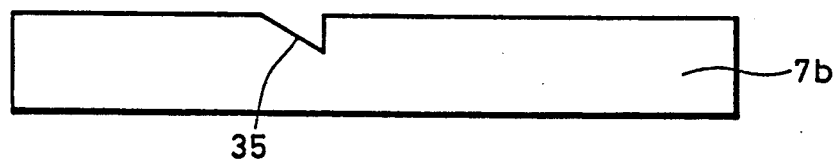
Figure 42B:
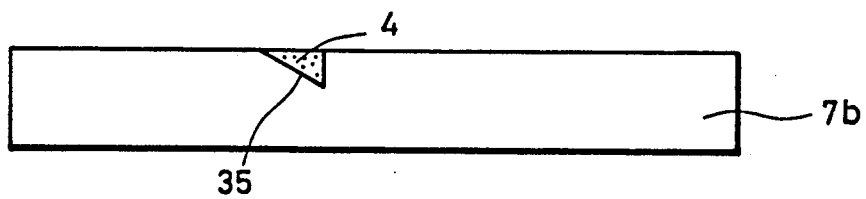
Figure 43B:
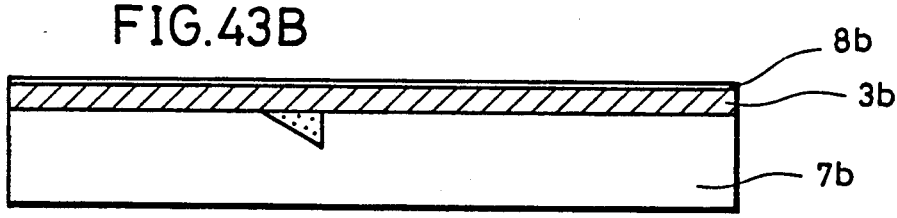
Figure 44B:
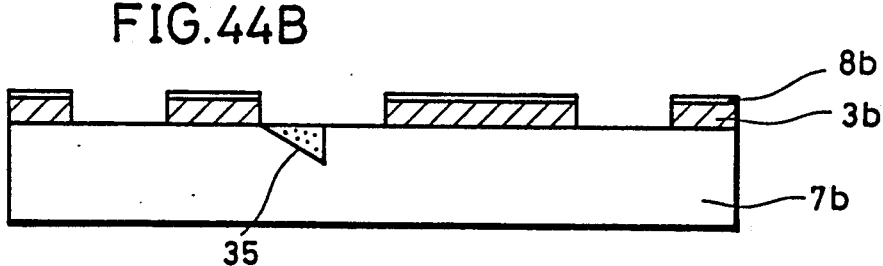
Figure 45B:
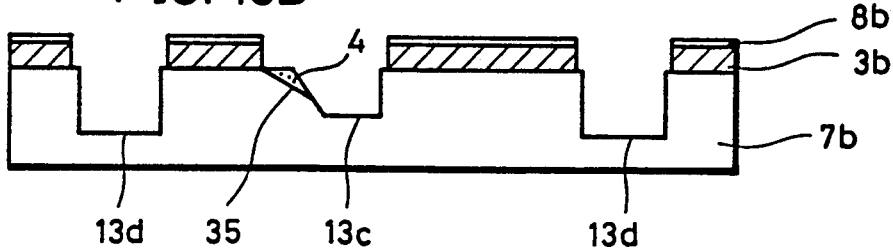

Referring to FIGS. 41A and 41B, track width regulating grooves 13b are worked simultaneously with formation of a groove 35 for regulating a depth end of a coil groove hole. When the track width regulating grooves 13b are filled with glass members 4, the depth end regulating groove 35 is also filled with a glass member 4, as shown in FIGS. 42A and 42B. Thereafter thin films are formed sequentially along FIGS. 43A, 43B, 44A and 44B, similarly to the aforementioned manufacturing steps. At this time, resist patterns for forming the thin films are so formed that a pattern end portion coincides with an end portion of the depth end regulating groove 35. Thereafter a coil groove 13c and glass rod receiving grooves 13d are formed by mechanical working, as shown in FIGS. 45A and 45B. Since the groove 35 for regulating the depth end of the coil groove 13c is filled with the glass member 4, depth end regulation can be performed in high accuracy without causing film separation or the like in mechanical recessing.

According to the present invention, as hereinabove described, internal strain of a ferromagnetic thin film is parted/relaxed, while impact applied to the thin film by mechanical recessing performed in a later step can be suppressed. Thus, the thin film can be prevented from separation caused by recessing. Consequently, it is possible to suppress reduction in manufacturing yield of magnetic heads. Further, a magnetic head, which can prevent separation of a ferromagnetic thin film without degrading magnetic property, can be provided. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a magnetic head having a magnetic gap between a pair of magnetic core halves abutted with each other through a nonmagnetic material, said method comprising the steps of:

preparing first and second magnetic core half members of ferromagnetic oxide having gap forming surfaces to be abutted with each other for defining said magnetic gap;

selectively forming a ferromagnetic thin film of a ferromagnetic metal material on said gap forming surface of at least said second magnetic core half member, said ferromagnetic thin film being so formed as (a) to expose a portion to be provided with a track width regulating groove and at least one of a coil groove and a joining member receiving groove in said gap forming surface of said first magnetic core half member and (b) to expose, in said gap forming surface of said second magnetic core half member, a portion to be provided with a track width regulating groove and a portion to be opposite to said at least one of said coil groove and said joining member receiving groove to be provided on said gap forming surface of said first magnetic core half member;

performing mechanical working on said exposed portion of said gap forming surfaces therein to provide said track width regulating groove and said at least one of said coil groove and said joining member receiving groove in said first magnetic core half member and to provide said track width regulating groove in said second magnetic core half member; and abutting said first and second magnetic core half members between said gap forming surfaces to join the same with each other.

2. A method of manufacturing a magnetic head in accordance with claim 1, wherein said step of selectively forming said ferromagnetic thin film comprises the steps of forming the ferromagnetic thin film of a ferromagnetic metal material entirely over said gap forming surface of at least said second magnetic core half member; and selectively removing said ferromagnetic thin film by etching processing.

3. A method of manufacturing a magnetic head in accordance with claim 2, wherein said step of selectively removing said ferromagnetic thin film includes removal of said ferromagnetic thin film by ion beam etching.

4. A method of manufacturing a magnetic head in accordance with claim 1, wherein said mechanical working includes employment of a rotating grindstone as a tool.

5. A method of manufacturing a magnetic head in accordance with claim 1, wherein said mechanical working said first and second magnetic core half members to join the same with each other includes:

formation of a first magnetic gap by abutment and joining of said first and second magnetic half members between said exposed portions within said gap forming surfaces; and formation of a second magnetic gap by abutment and joining of said first and second magnetic core half members between said portions provided with said ferromagnetic thin film within said gap forming surfaces.

6. A method of manufacturing a magnetic head in accordance with claim 1, wherein said step of selectively forming said ferromagnetic thin film includes interposition of heat-resistant thin films between said magnetic core half members and said ferromagnetic thin film.

7. A method of manufacturing a magnetic head in accordance with claim 1, wherein said step of selectively forming said ferromagnetic thin film includes formation of nonmagnetic thin films on said ferromagnetic thin films.

8. A method of manufacturing a magnetic head in accordance with claim 1, wherein said step of joining said first and second magnetic core half members with each other includes joining of said first and second magnetic half members attained by inserting a glass rod into said joining member receiving groove so that the same is molten to fill said track width regulating groove with glass members.

9. A method of manufacturing a magnetic head having a magnetic gap between a pair of magnetic core halves abutted with each other through a nonmagnetic material, said method comprising the steps of:
preparing first and second magnetic core half members of ferromagnetic oxide having gap forming surfaces to be abutted with each other for defining said magnetic gap;
forming track width regulating grooves on said gap forming surfaces of said first and second magnetic core half members;
filling said track width regulating grooves with joining members;
selectively forming a ferromagnetic thin film of a ferromagnetic metal material on said gap forming surface of at least said second magnetic core half member, said ferromagnetic thin film being so formed as (a) to expose a portion to be provided with at least one of a coil groove and a joining member receiving groove in said gap forming surface of said first magnetic core half member, and (b) to expose, in said gap forming surface of said second magnetic core half member, a portion to be opposite to said at least one of said coil groove and said joining member receiving groove to be provided in said gap forming surface of said first magnetic core half member;
performing mechanical working on said exposed portions of said gap forming surfaces therein to provide said at least one of said coil groove and said joining member receiving groove in said first magnetic core half member; and
abutting said first and second magnetic core half members between said gap forming surfaces to join the same with each other.

10. A method of manufacturing a magnetic head in accordance with claim 9, wherein said step of selectively forming said ferromagnetic thin film comprises the steps of:
forming the ferromagnetic thin of a ferromagnetic metal material entirely over said gap forming surface of at least said second magnetic core half member; and
selectively removing said ferromagnetic thin film by etching processing.

11. A method of manufacturing a magnetic head in accordance with claim 10, wherein said step of selectively removing said ferromagnetic thin film includes removal of said ferromagnetic thin film by ion beam etching.

12. A method of manufacturing a magnetic head in accordance with claim 9, wherein said mechanical working includes employment of a rotating grindstone as a tool.

13. A method of manufacturing a magnetic head in accordance with claim 9, wherein said step of selectively forming said ferromagnetic thin film includes interposition of heat-resistant thin films between said magnetic core half members and said ferromagnetic thin film.

14. A method of manufacturing a magnetic head in accordance with claim 9, wherein said step of selectively forming said ferromagnetic thin film includes formation of nonmagnetic thin films on said ferromagnetic thin film.

15. A method of manufacturing a magnetic head in accordance with claim 9, wherein said step of joining said first and second magnetic core half members includes joining of said first and second magnetic core half members attained by inserting a glass rod into said joining member receiving groove so that the same is molten to fill said track width regulating grooves with glass members.

16. A method of manufacturing a magnetic head in accordance with claim 9, wherein said step of selectively forming said ferromagnetic thin film includes such formation of ferromagnetic films that width of said gap forming surfaces to be provided with said ferromagnetic thin film along track width is larger than track width of said magnetic gap.

* * * * *